United States Patent
Nonaka et al.

(10) Patent No.: US 6,519,243 B1
(45) Date of Patent: Feb. 11, 2003

(54) COMMUNICATION SYSTEM FOR COMMUNICATIONS DEVICES UTILIZING ASYMMETRICAL PATHS AND COMMUNICATIONS METHOD UTILIZING ASYMMETRICAL PATHS

(75) Inventors: Naomichi Nonaka, Kawasaki (JP); Susumu Matsui, Machida (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/258,450

(22) Filed: Feb. 26, 1999

(30) Foreign Application Priority Data

Feb. 26, 1998 (JP) .......................................... 10-045691

(51) Int. Cl.$^7$ .......................... H04Q 7/24; H04L 12/28; G06F 15/16
(52) U.S. Cl. ....................... 370/338; 370/356; 370/389; 370/401; 370/465; 709/202; 709/230
(58) Field of Search ................................. 370/315, 327, 370/328, 329, 338, 349, 355, 352, 356, 389, 401, 402, 465; 709/217, 202, 203, 213, 230, 249, 250; 455/313, 319, 450, 455; 345/513, 738

(56) References Cited

U.S. PATENT DOCUMENTS

| | | | | | |
|---|---|---|---|---|---|
| 5,303,344 | A | * | 4/1994 | Yokoyama et al. | 370/466 |
| 6,038,594 | A | * | 3/2000 | Puente et al. | 709/217 |
| 6,301,223 | B1 | * | 10/2001 | Hrastar et al. | 370/227 |
| 6,370,571 | B1 | * | 4/2002 | Medin, Jr. | 709/202 |
| 6,397,264 | B1 | * | 5/2002 | Stasnick et al. | 345/738 |

FOREIGN PATENT DOCUMENTS

| | | |
|---|---|---|
| JP | 9252271 | 9/1997 |
| JP | 10257098 | 9/1998 |

OTHER PUBLICATIONS

V. Arora et al., "Asymmetric Internet Access over Satelite—Terrestrial Networks", American Institute of Aeronautics, Inc., pp 1–.*

V. Arora, et al., "Asymmetric Internet Access over Satelite—Terrestrial Networks", American Institute of Aeronautics and Astronautics, Inc., pp. 1–7. 1995.

M. Nakayama, et al., "Satellite Network Interface Card for Multimedia Interactive Satelite Communication System", Technical Report of IEICE, SAT98–34, Jul./1998, pp. 31–36.

* cited by examiner

*Primary Examiner*—Hassan Kizou
*Assistant Examiner*—Afsar M. Qureshi
(74) *Attorney, Agent, or Firm*—Antonelli, Terry, Stout & Kraus, LLP

(57) ABSTRACT

A communication system using asymmetrical paths for performing asymmetrical routing using unidirectional paths for unidirectional packet communication without changing existing protocols in network systems configured for bidirectional packet communication using bidirectional paths. The communication system includes a receiver gateway installed in a satellite receiver station for performing address substitution on a packet transmitted from a personal computer (PC) to a server via an Internet network, and a transmitter gateway installed in a satellite transmitter station that receives the substituted packet and transmits the substituted packet to the server. Particularly, the transmitter gateway transmits the substituted packet to the PC from the server by transmitting the substituted packet to the receiver gateway by way of a satellite. The receiver gateway sends the substituted packet to the PC.

36 Claims, 15 Drawing Sheets

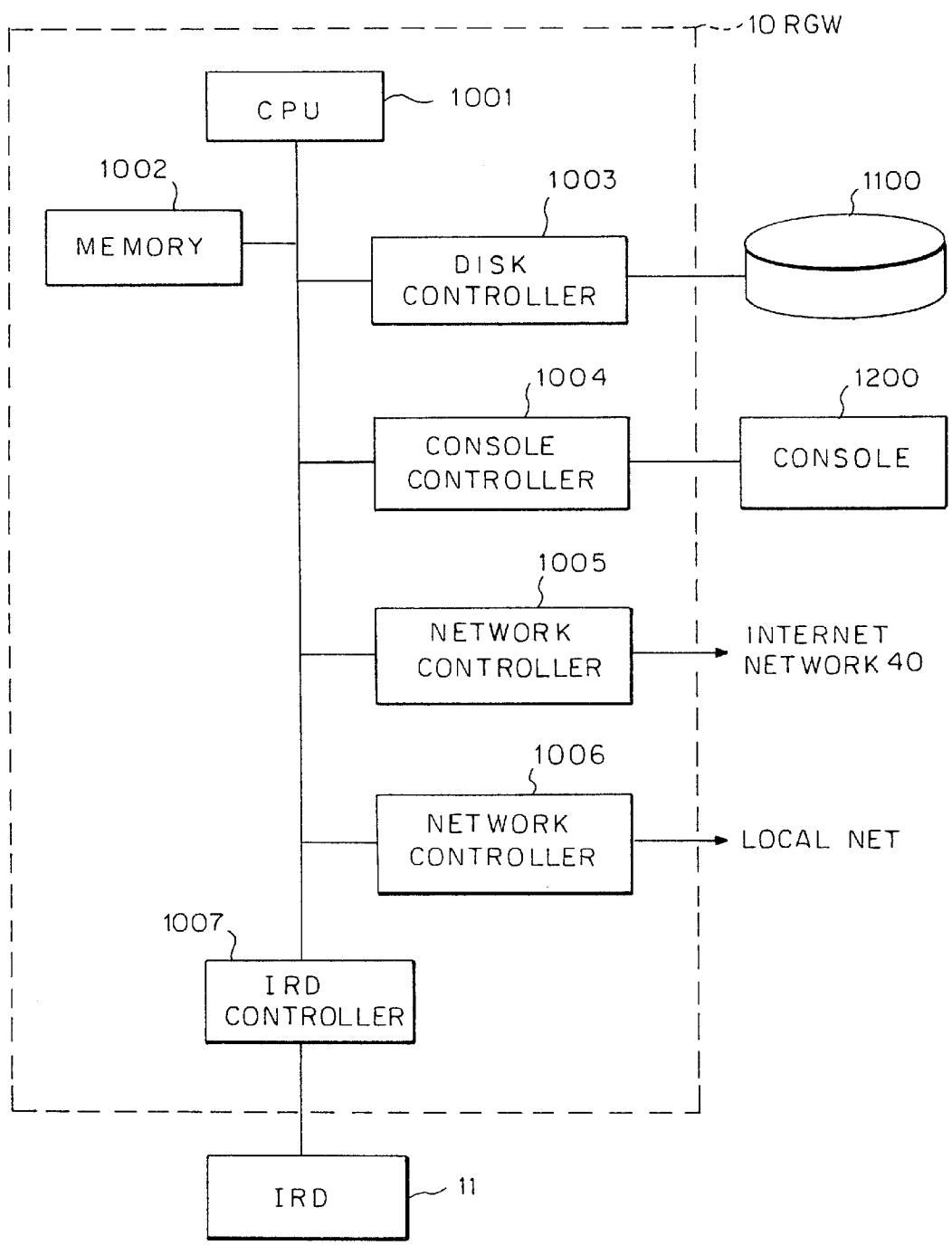

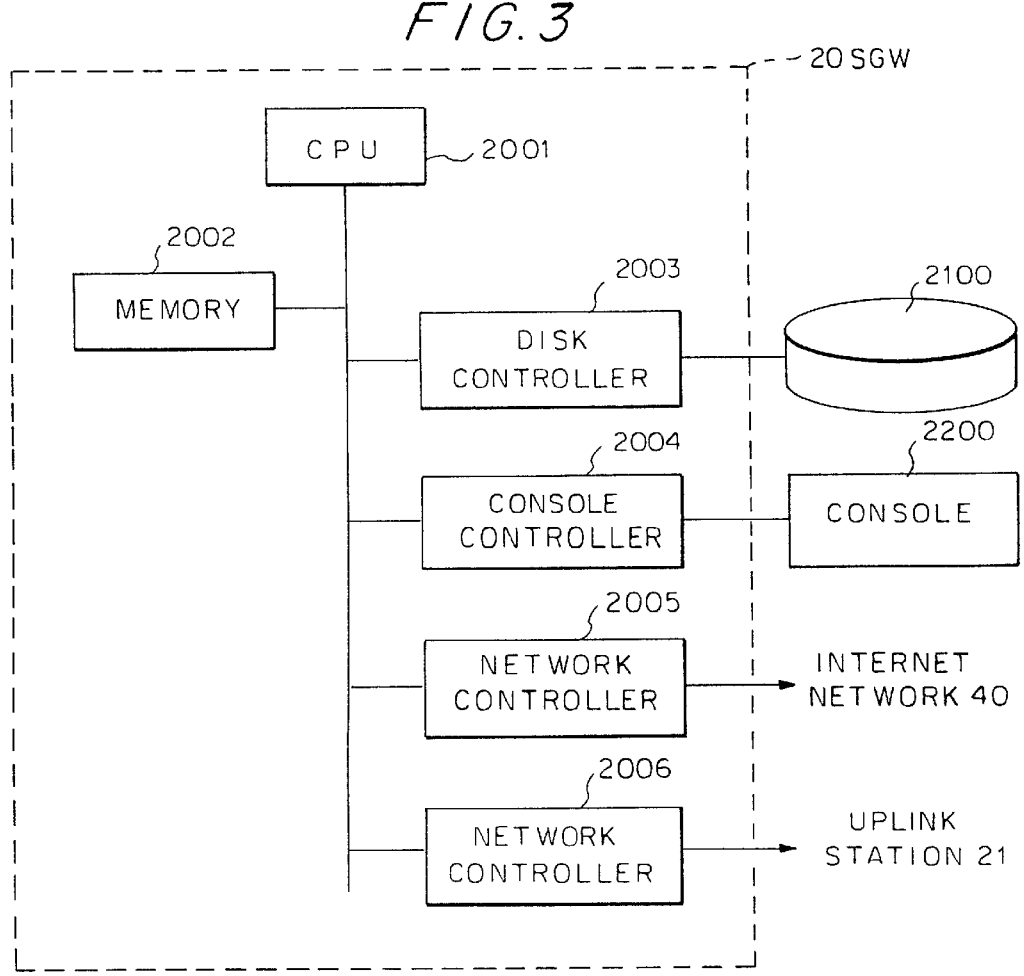

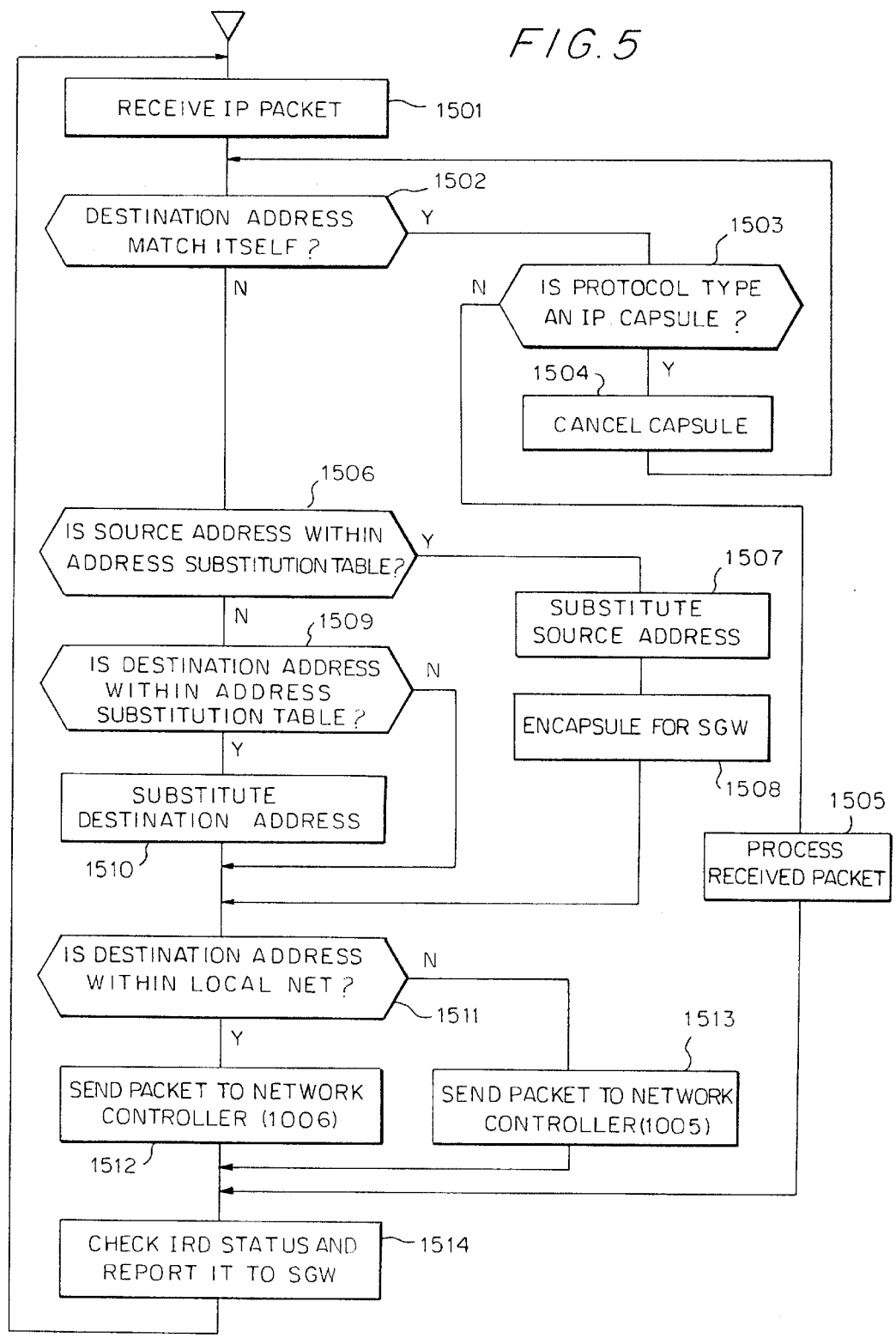

FIG.6

| RGW ADDRESS 1 | ADDRESS RANGE 1 | RECEIVER STATION STATUS 1 |
|---|---|---|
| RGW ADDRESS 2 | ADDRESS RANGE 1 | RECEIVER STATION STATUS 2 |
| --- | --- | --- |
| RGW ADDRESS n | ADDRESS RANGE n | RECEIVER STATION STATUS n |

2701 / 2702 / 2703

270 RECEIVER STATION MANAGEMENT TABLE

FIG. 13

| ADDRESS SUBSTITUTION TABLE | | | 3000 |
|---|---|---|---|
| SOURCE ADDRESS TABLE 1 | TRANSMITTER STATION PROXY ADDRESS 1 | RECEIVER STATION PROXY ADDRESS 1 | |
| SOURCE ADDRESS TABLE 2 | TRANSMITTER STATION PROXY ADDRESS 2 | RECEIVER STATION PROXY ADDRESS 2 | |
| --- | --- | --- | |
| SOURCE ADDRESS TABLE n | TRANSMITTER STATION PROXY ADDRESS n | RECEIVER STATION PROXY ADDRESS n | |
| 1701 | 1702 | 1703 | |

COMMUNICATION SYSTEM FOR COMMUNICATIONS DEVICES UTILIZING ASYMMETRICAL PATHS AND COMMUNICATIONS METHOD UTILIZING ASYMMETRICAL PATHS

TECHNICAL FIELD

The present invention relates to a communication system. More particularly, the present invention relates to a communication system for performing bi-directional communication utilizing asymmetrical communications paths form by a combination of bidirectional communications paths utilizing cables and unidirectional communications paths as typified by satellite communications.

BACKGROUND OF THE INVENTION

Protocols are utilized for performing data transfer or exchange between different network systems when carrying out communications on an Internet system linking a plurality of different network systems. At higher levels the designs of hierarchical communications protocols are becoming widespread for performing data exchange between application programs.

A routing protocol currently widely used for packet exchange between different network systems is designed under the preconditioned that the same path is used for two-way (or bidirectional communication). Consequently, utilizing as is, one-way (unidirectional) paths such as satellite communications having only unidirectional communications from the broadcast station to the receiver (receiving station) or running applications designed under the precondition of bidirectional communications capability is impossible.

One proposed solution was improving the network layer routing protocol to handle unidirectional paths. However, such a method was not practical since several hundred thousand pieces of communications equipment would have to be modified to accommodate the change. A proxy server has been established to function as a relay of application level protocol by performing asymmetrical routing utilizing unidirectional paths without changing the pre-existing bidirectional routing protocol. The proxy server allowed utilization of asymmetrical communications paths by performing routing that used unidirectional paths.

However, since the various application protocols such as telnet, ftp, http were being standardized and utilized in large numbers according to the application goal, in the abovementioned proxy server method, it became necessary to provide a proxy server to match each individual application protocol. This presented the problem that a large number of proxy servers must be prepared and that newly standardized protocols could not immediately be used since no corresponding proxy protocol was available.

SUMMARY OF THE INVENTION

The present invention provides an asymmetrical path communications system utilizing asymmetrical routing with unidirectional paths, without changing the preexisting routing protocol, in network systems built up under the precondition of performing bidirectional packet communications using bidirectional paths.

The communications of the present invention utilizes asymmetrical paths and a network system that is configured under the precondition that packet bidirectional communication is performed using bidirectional paths. The present invention includes a unidirectional path for performing packet unidirectional communication, and a communication device (hereafter called a "receiver gateway") connected to the network system established at the transmission site of the unidirectional path and connected to a local system separate from the network system. The receiver gateway has a first address substitution element in which the source address of the packet sent from the local system is substituted for an address (hereafter called "proxy address") assigned beforehand within the network system for the transmission site of the unidirectional path and then sent, after substitution with the substituted address, to the network system, and a second address substitution element in which when the destination address of the packet sent from the unidirectional path is the proxy address, after the proxy address is substituted into the address of the communications device connected to the local system. The packet after substitution is sent to the local system, the receiver gateway has a routing element for transmitting a packet on a unidirectional path when the destination address of the packet send from the network system is the proxy address, and for transmitting the packet on the network when the destination address is not the proxy address.

In the arrangement described above, when performing communications between a communications device (Type 1 communications devices) connected to the local system and a communications device (Type 2 communications device) connected to the network system, the packet sent from the Type 2 communications device to the Type 1 communications device is sent by utilizing a unidirectional path and the packet sent from the Type 1 communications device to the Type 2 communications device is sent by utilizing the network system (bidirectional path). Thus, communication can be performed utilizing asymmetrical paths without changing the preexisting routing protocol on the network system.

In the above mentioned configuration, the first address substitution element for the receiver gateway encapsulates the packet after substitution and sends the encapsulated packet to the transmitter gateway by way of the network system. The routing element for the transmitter gateway is capable of performing routing of a packet extracted from the capsule when a packet sent from the network system is an encapsulated packet. Also, in the above configuration, the receiver gateway further has a communication element for detecting whether the unidirectional path is capable of communication and informing the transmitter gateway of the detection results by way of the network system.

The transmitter gateway has a storage element for storing the detection results communicated by the receiver gateway. The routing element is capable of substituting the destination address of the packet for transmission on the unidirectional path into the proxy address, and after substitution transmitting the packet to the receiver gateway by way of the network system in the event that the unidirectional path cannot be used for communication. The local system can be connected to more than one communications device, and when connected to two or more communications devices, the local system essentially forms a local network system connecting these communications devices.

BRIEF DESCRIPTION OF THE DRAWINGS

The scope of the present invention will be apparent from the following detailed description, when taken in conjunction with the accompanying drawings, and such detailed description and specific examples, while indicating embodiments of the invention, are given by way of illustration only, since various changes and modifications within the spirit and scope of the invention will become apparent to those skilled in the art from this detailed description, in which:

FIG. 2 is a block diagram of RGW hardware of an embodiment of the present invention;

FIG. 3 is a block diagram of SGW hardware of an embodiment of the present invention;

FIG. 4 is an address substitution table of an embodiment of the present invention;

FIG. 5 is a flowchart of RGW program processing of an embodiment of the present invention;

FIG. 6 is a receiver station management table of an embodiment of the present invention;

FIG. 13 is an address substitution table of another embodiment of the present invention;

DETAILED DESCRIPTION OF THE EMBODIMENTS

Hereafter, examples of the embodiments of the present invention will be described while referring to the accompanying drawings.

An asymmetrical communications system of the embodiment of the present invention is a network system configured including a satellite system as a unidirectional system for performing unidirectional packet communications utilizing unidirectional paths and an Internet network as a network system configured under the precondition that bidirectional packet communications utilize bidirectional paths.

Figure 1:
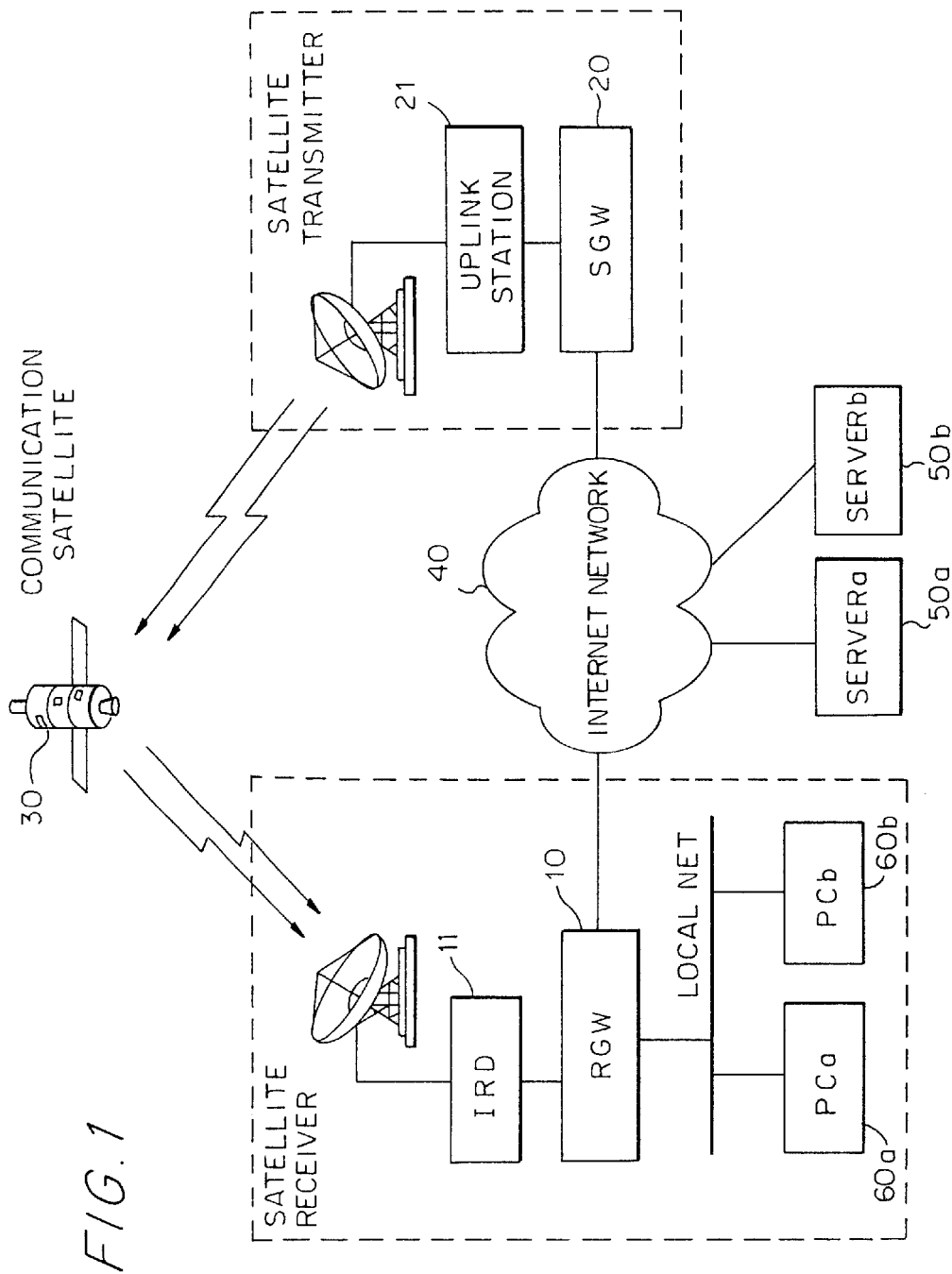
FIG. 1 is block diagram of the communications system utilizing asymmetrical paths of an embodiment of the present invention.

FIG. 1 illustrates the structure of the asymmetrical communications system of an embodiment of the present invention. In the FIG. 1, reference numeral 10 is a receiver gateway (RGW), 11 is a satellite receiver (IRD), 20 is a transmitter gateway (SGW), 21 is an uplink station, 30 is a communications satellite, 40 is an Internet network, 50a and b are servers, and 60a and b are personal computers (PC).

As can be seen in FIG. 1, as a satellite transmitter station including the satellite communications system, this embodiment has an SGW 20 (transmitter gateway) installed in addition to an uplink station 21 identical to the satellite transmitter station of the conventional art. Further, as a satellite receiver station including the satellite communications system, an RGW 10 (receiver gateway) is installed in addition to the IRD 11 (satellite receiver) identical to the satellite receiver station in the conventional art.

Here, the RGW 10 receiver gateway is connected to the Internet network 40. The transmitter gateway SGW 20 along with being connected to the Internet network 40 is also connected to one or more PC's 60a and b connected to a local net. One or more servers 50a and b are connected to the Internet network 40. Unidirectional communication between a satellite receiver station and a satellite transmitter station can be performed from a transmitter/receiver station to a transmitter receiver station by way of communication satellite 30. Further, bidirectional communication can be performed by way of the Internet network 40.

Of the communications devices including the communications system utilizing asymmetrical paths in this embodiment, if there are cases where operating is by the same main operating element, there are also cases where an aggregate of communication devices are operated per a separate operating element.

This embodiment provides asymmetrical routing by use of the SGW 20 and the RGW 10. Besides having the function of asymmetrical routing, the RGW 10 also possesses the function of Internet Protocol (IP) firewall router. A typical routing path must first be explained before attempting to describe an IP packet path during asymmetrical routing.

To explain it is assumed that the personal computer PCa 60a in the local network and a server a 50a of the Internet network 40 are exchanging communications. In PCa 60a, the IP packet for the source address "PCa" and for destination address "server a" is transmitted. Conversely, in server a 50a, the IP packet for the source address "server a" and the destination address "PCa" is transmitted.

The Internet network 40 is an aggregate of mutually collected routers. These routers mutually exchange path information and actively select paths on which to transmit a packet and the packet is then transmitted between routers. In the path information exchange protocol that is currently used, the path itself has no directionality so that an IP packet transmitted from PCa 60a to server a 50a, and an IP packet transmitted from server a 50a to PCa 60a are sent in opposite directions on the same path.

When utilizing unidirectional paths on this kind of Internet network 40, theoretically the path information utilized by the router to set a path, contains information to illustrate that the path is unidirectional. Further, if a router is designed to determine the path in consideration of the direction of the path, then such a method can obviously be utilized and requires no special handling for a unidirectional path. However in order to make such a method functional, all of the routers on the Internet network 40 would require modification in order to interpret the path direction information. Such a method is therefore probably impractical in terms of cost and labor.

The present embodiment discloses a communications system utilizing asymmetrical paths achieved with designated routers SGW 20 and RGW 10 having unidirectional path information. In this embodiment, the IP packet sent from PCa 60a to the server a 50a is transmitted along the route "PCa 60a→local network→RGW 10→Internet network 40→SGW 20→Internet network 40→Server 50a". The IP packet sent from the server a 50a to the PCa 60a is transmitted along the route "Server 50a→Internet network 40→SGW 20→Uplink station 21→communications satellite 30→IRD11→RGW 10→local network→PCa 60a".

In the present embodiment, when sending a packet to the server a 50a from the PCa 60a, first of all, in PCa 60a an IP packet is made having the source address "PCa" and the destination address "server a" and the IP packet is then sent to the RGW 10 by way of the local network. The IP packet at this point, is illustrated as 1801 in FIG. 8.

Figure 8:
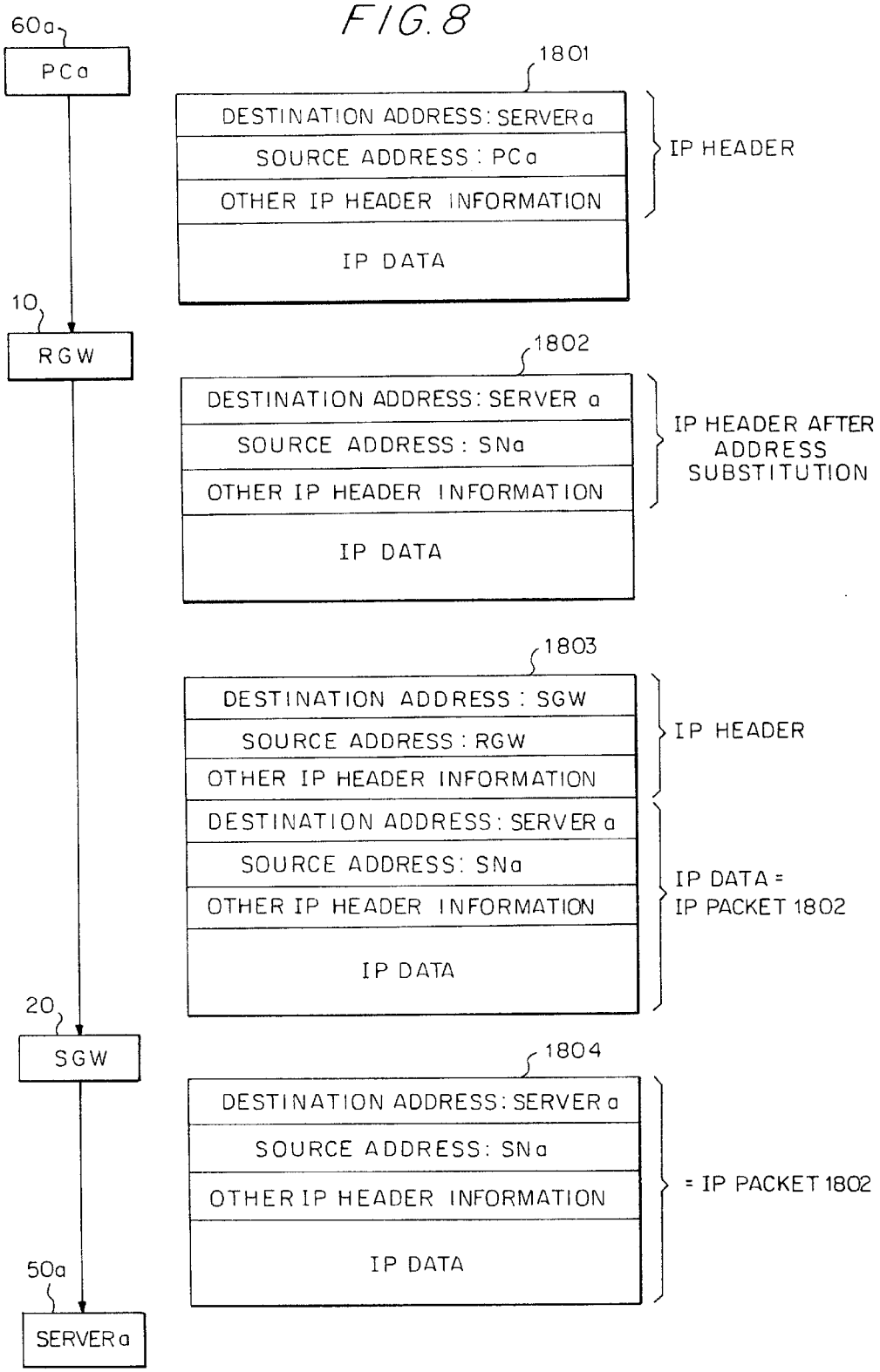
FIG. 8 is a drawing illustrating a flow of an IP packet of an embodiment of the present invention.

The RGW 10 performs substitution of the source address for the IP packet sent from the local net and as illustrated in 1802 in FIG. 8, the source address "PCa" is rewritten in the proxy address as "SNa". Here, the proxy address "SNa" as related in detail below, is the IP address assigned independently to PCa 60a at the satellite transmitter station site within the range of the IP address assigned to the satellite transmitter station site from the address management facility on the Internet network 40. As is described in detail below, for IP packets which are at the destination address "SNa", the Internet network 40 holds path information for distributing the IP packet to the satellite transmitter station site in other words, SGW 20.

Next, the RGW 10 transmits the IP packet rewritten with the source address of SGW 20 by way of the Internet network 40. In this case, the RGW 10 encapsulates the content of the IP packet inside the IP packet to be sent and transmits the IP packet to the SGW 20. This transmission of an encapsulated IP packet is generally called "tunneling". As illustrated in 1803 in FIG. 8, the IP packet on the outer side of the capsule is the source address "RGW" and the destination address is "SGW", and the IP packet is transmitted along the usual routing path.

SGW 20, then, receives the encapsulated IP packet, cancels the IP packet, and transmits it to the Internet network. In the IP packet transmitted, as illustrated at numeral 1804 in FIG. 8, the destination address is "server a", and the IP packet is conveyed to the server a 50a along the usual routing path.

The SGW 20 transmits the substituted address from "RGW" to the "server a", since the destination address of the IP packet after address substitution is "server a". If RGW 10 transmits the IP packet with the address on which substitution was performed, directly to the Internet network 40, the IP packet may not arrive at the server a 50a. If the source address "SNa" of the IP packet sent from the RGW 10 is not the IP address assigned to RGW 10 by the Internet network 40 address management facility, the IP packet may possibly be identified as an incorrect packet within the Internet network 40. Consequently, in this embodiment, the packet is sent to SGW 20 by use of tunneling and by transmitting to the Internet network 40 from the SGW 20. The source address of the IP packet is matched with the assigned address of the connection site for use when that IP packet has been transmitted to the Internet network 40. Thus, there is no possibility of the IP packet being judged as incorrect.

Figure 9:
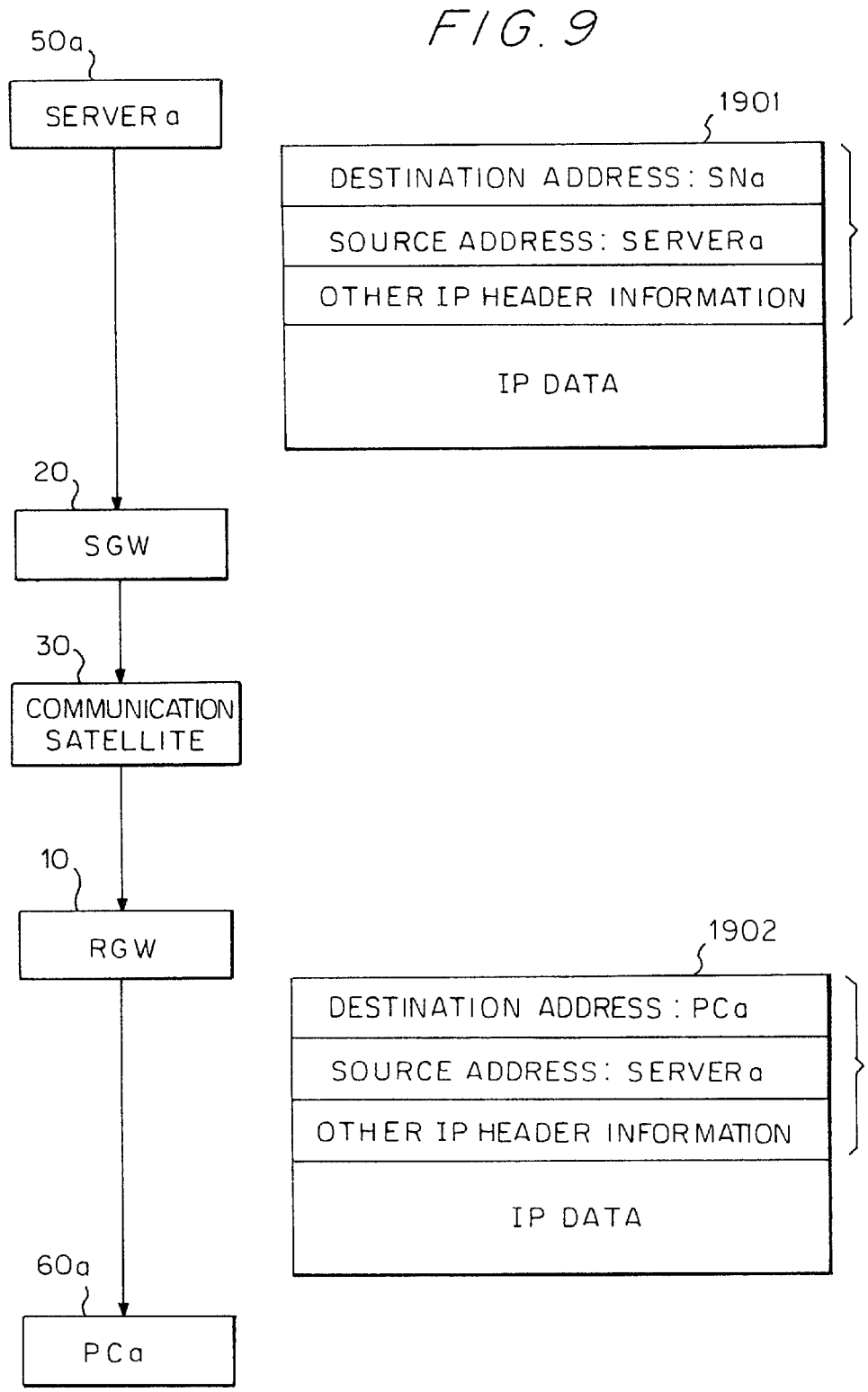
FIG. 9 is a drawing illustrating a flow of an IP packet of an embodiment of the present invention.

Next, the process flow for sending the IP packet to the PCa 60a from the server a 50a is described. In the server a 50a, the IP packet generated at this time as a response to the IP packet that arrived as illustrated in 1901 of FIG. 9 forms an IP packet with a source address "server a" and a destination address "SNa". The destination address "SNa" of this IP packet is within the range of the IP addresses assigned to the satellite transmitter station site from the Internet network 40 address management facility so that the packet arrives at SGW 20 along the usual routing paths by way of the Internet network 40.

The SGW 20 transmits this IP packet to the uplink station 21. The uplink station 21 stores the IP packet as a payload of the satellite data packet and transmits the packet to a communications satellite 30. Then, the data that arrived from the communications satellite 30 is received by the IRD 11 and transmitted to the RGW 10. As illustrated in 1902 of FIG. 9, the RGW 10 substitutes "Pca" for the destination address "SNa" into "PCa" and then transmits the IP packet to the local network. The PCa 60a receives the destination address of this IP packet since the name is "PCa", and mutual communication between the PCa 60a and the server a 50a is established.

The above describes the operation during asymmetrical routing.

A detailed explanation of the substitution process of the IP address and the routing process is omitted since the technology for accomplishing those processes are well known. Further, in this embodiment, since the network system is configured under the precondition of performing bidirectional communication on the Internet network 40, the IP packet sent from the server a 50a to the PCa 60a is capable of being transmitted by utilizing bidirectional paths on the Internet network 40 and not the unidirectional path of the satellite communications system.

In other words, in describing the flow of the IP packet transmitted to the PCa 60a from the server a 50a, when the SGW 20 receives the IP packet transmitted from the server a 50a by way of the Internet network 40, the applicable IP packet is transmitted to the RGW 10 by way of the Internet network 40. In this case, the SGW 20 first encapsulates the IP packet to be transmitted and then sends the IP packet to the RGW 10. As illustrated in 1901 in FIG. 10, the IP packet transmitted from the server a 50a is a source address "server a" and a destination address "SNa". Further, the IP packet on the external side of the IP encapsulated by the SGW 20 is a source address "SGW" illustrated in 1903 in FIG. 10 and a destination address "RGW". This IP packet is transmitted along the normal routing path.

Figure 10:
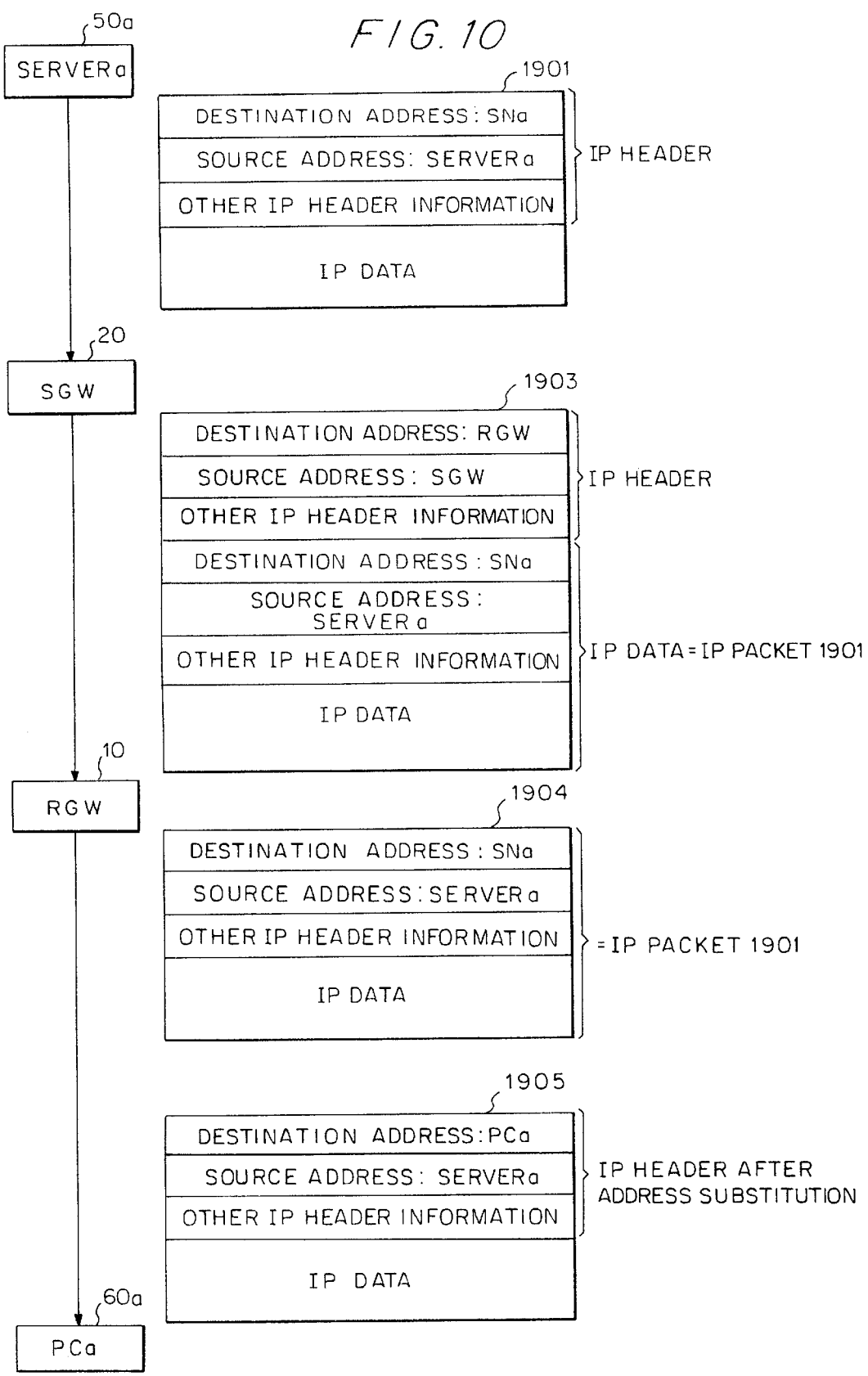
FIG. 10 is a drawing illustrating a flow of an IP packet of an embodiment of the present invention.

As illustrated in 1904 in FIG. 10, when the RGW 10 receives the encapsulated IP packet, substitution of the destination address is performed along with eliminating the capsule and the destination address "SNa" is rewritten to "PCa" as illustrated in 1905 in FIG. 10. The RGW 10 then transmits the IP packet now rewritten with the destination address to the local network. The IP packet sent here as illustrated in 1905 of FIG. 10 is a destination address "PCa" and is therefore conveyed to PCa 60a.

Generally, routing is actively performed to calculate possible paths on the Internet network so that in sections with a plurality of routes present between routers, communication can still be continued between communications devices, even if a portion of the path is cut off or interrupted. In data communication utilizing the communications satellite 30, since this system is susceptible to the effects of bad weather, the local error rate can sometimes reach nearly 100 percent due to rainy weather. Thus, it is essential to take into account temporary circuit interruptions, when utilizing satellite data circuits.

In this embodiment, when an interruption in the satellite data circuit is detected at the RGW 10, a request is and transmitted to the SGW 20 by way of the Internet network 40. The IP packet which is to be sent to RGW 10 from the SGW 20 is now transmitted by way of the Internet network 40 utilizing the tunneling technique as illustrated in FIG. 10 and not by the satellite circuit 30. Therefore even if the unidirectional path (satellite data circuit) between the RGW 10 and SGW 20 is interrupted or cut off, the communication can be continued between the PC 60 and the server 50 without causing an interruption or cut off in the circuit.

In the present embodiment, when the satellite data circuit is operating correctly, the communications between the PC 60 and the server 50 utilize one side of the bidirectional path on the Internet network 40 and the unidirectional path of the satellite communications system. However, when the satellite data circuit is cutoff or interrupted, the communications between the PC 60 and the server 50 utilizes both sides of the bidirectional path in the Internet network 40.

As an example, when the application program running on the PCa 60a accesses the server a 50a, the data transmitted from the PCa 60a to the server a 50a is data in small amounts including various commands. However the data transmitted to the PCa 60a from the server a 50a is generally data in large quantities such as image data and programs, etc. In such cases, the data transmitted from the server a 50a to the PCa 60a is transmitted by way of satellite data circuits and is a considerably larger quantity of data than is possible on the Internet network 40 so that the time required for transmission is shortened. This is a big advantage for the PCa 60a user.

Here, in order to explain the proxy address "SNa" which is an IP address utilized when performing address substitution by RGW 10, a brief explanation of the IP address will be related. The IP address is a number of a fixed length for identifying the particular communications device for carrying out communications by using an Internet protocol. In the "IP protocol Version 4" the IP address is a binary number with a 32 bit length. In the "IP protocol Version 6" the IP address is a binary number with a 128 bit length. The IP address is divided into a network address and a host address. All IP addresses whose host address is "0" are determined when illustrating the network itself. Of these fixed length IP addresses, the portion to be utilized as the network address is variable, so a subnet mask value is used to illustrate the value of this portion. Refer to the Internet document, RFC (Request for Comments) to obtain further details on the IP address system.

In order for communications utilizing IP protocol to operate smoothly, the different communications devices must not be allowed to use the same IP address. Generally, in order to operate a plurality of operating entities as an aggregate on the Internet, some kind of address management facility must be provided in order to use the IP address. When an operating entity connects a local network to the Internet, the address management facility assigns a network address range, which corresponds to a fixed number of communications devices, to the local network and assigns an IP address to each communications device on the local network. The address management facility then takes responsibility for matching the operating entities using the local network, in what is the most widely used arrangement. When only a single operating entity is operating on the Internet, that operating element is used jointly with the address management facility.

In order for the satellite transmitter station site to connect to the Internet network 40, a network address has to be assigned from the address management facility. However, in such cases, the operator of the satellite transmitter station site must assign beforehand a large network address range corresponding to the total number of proxy addresses need at the satellite transmitter station site. A portion of the assigned network address is then divided up at each satellite receiver station site and permission given for use of the IP address within that range. The RGW 10 selects the address within the local network and the proxy address to use for substitution, from among the IP address range approved for use that arrive from the satellite transmitter station site.

There are two methods the RGW 10 can utilize to find a usable proxy address. In one method, a proxy address is assigned beforehand for each RGW 10. In another method, the RGW 10 and the SGW 20 exchange information allowing the RGW 10 to actively acquire a useable proxy address. Either of these methods can be implemented. In the example related in this embodiment, the method assigning a proxy address beforehand to each RGW 10 is employed. The RGW 10 and the SGW 20 require operations different from the operations normally used for communication devices on the Internet network 40 in order to implement the above described asymmetrical routing. These operations are described below in detail.

A description of the RGW 10 is provided below. A block diagram illustrating the layout of the hardware of the RGW 10 is illustrated in FIG. 2. The RGW 10 is a computer system for operating a router on the Internet network 40. As illustrated in FIG. 2, the RGW 10 includes a CPU 1001, a memory 1002, a disk controller 1003, a hard disk 1100, a console controller 1004, a console 1200, a network controller 1005, a network controller 1006 and an IRD controller 1007.

The CPU 1001 controls the overall operation of the RGW 10. The memory 1002 holds a program executable by CPU 1001 and data. The disk controller 1003 regulates operation of the hard disk (external memory) 1100. The hard disk 1100 stores the program and data. The console controller 1004 controls the console 1200. The console 1200 performs input and output of data via the user. The network controller 1005 performs communication with the Internet network 40. The network controller 1006 performs communication with the local network. The IRD controller 1007 controls the IRD11. The IRD11 receives data transmitted from the communications satellite 30, extracts the IP packet from among the received data, and transmits the IP packet to the RGW 10.

The operation of the RGW 10 will now be described. The RGW 10 operation is implemented by CPU 1001 executing a RGW processing program as described below. FIG. 4 is an address substitution table utilized in the RGW program processing. As illustrated in FIG. 4, an address substitution table 1700 includes of a source address field 1701 and a proxy address field 1702. The IP address for PC 60 in the local network, is stored in the source address field 1701. The value for the IP proxy address received from the satellite transmitter station site and approved for use in address substitution, is stored in the proxy address field 1702.

FIG. 5 is a flowchart of the RGW processing program. The RGW processing program is executable by the CPU 1001 so as to perform the steps illustrated in FIG. 5. Each of the steps illustrated in FIG. 5 correspond to one or more instructions of the RGW processing (computer) program. The RGW processing program can, for example, be stored in memory 1002 or external memory 1100. The RGW processing program can also be provided to the RGW 10 for installation therein by a storage medium or network such as the Internet network. The storage medium could, for example, be a floppy disk, CD ROM, etc.

As illustrated in FIG. 5, when the RGW 10 receives an IP packet (step 1501) from any one of the network controller 1005, the network controller 1006, or the IRD controller 1007, the destination address of that IP packet is checked to determine whether destination address matches the address of the RGW 10 (step 1502). If there is a match, a check is made to determine whether the protocol type for the IP packet is an encapsulated IP packet (step 1503).

If the check performed in step 1503 indicates the IP packet to be an encapsulated IP packet, the IP packet was received from SGW 20 by way of the Internet network 40. The IP packet from SGW 20 corresponds to the IP packet illustrated in FIG. 10. Thereafter, the RGW 10 extracts the encapsulated IP packet (step 1504). The operation flow then returns to step 1502 for performing processing of the extracted IP packet.

If the check performed in step 1503 indicates the IP packet is not an encapsulated IP packet, then operation proceeds to step 1505 and the RGW 10 processes the IP packet that was received. In step 1505 various processings are performed in accordance with the Internet protocol. This portion of the processing is no different from packet processing in a normal router so that a detailed explanation is omitted here. After step 1505 the operation proceeds to step 1514.

If the destination address does not match the address of the RGW as per step 1502, then the RGW 10 refers to the address substitution table 1700 and checks to determine whether the source address matches any of the values of the source address field 1701 (step 1506).

A source address found to be a match as per step 1506 signifies that the IP packet was received by way of the local network from the PC 60. The IP packet received corresponds to that illustrated in FIG. 8. The RGW 10 performs substitution of the proxy address for the source address (step 1507). The IP packet whose address has been substituted as the destination address "SGW" is then encapsulation in the IP packet having a source address of "RGW" (step 1508), and the encapsulated IP packet is transmitted.

If the source address is not a match as per step 1506, then the RGW 10 refers to the address substitution table 1700 and the destination address is checked to determine whether there is a match with any of the values in the proxy address field 1702 (step 1509). A match found in this step signifies an IP packet received by way of the communications satellite 30 from the SGW 20. The IP packet received corresponds to that illustrated in FIG. 9. The match alternatively signifies an IP packet extracted in step 1504. Thus, substitution into the original address of the destination address is performed in compliance with the contents of the address substitution table 1700 (step 1510). When a match is not found, the operation proceeds directly to step 1511.

In step 1511, the RGW 10 checks whether the destination address of the IP packet is within the range of addresses assigned to the local network. If the destination address is within this range, the IP packet matching for the network controller 1006 is transmitted (step 1512) and if not within the range, the IP packet for the network controller 1005 is transmitted (step 1513).

When transmission of the IP packet is complete, the operation proceeds to step 1514 and the RGW 10 checks whether Radio Frequency (RF) transmission from the communication satellite 30 was received correctly by the IRD11. The SGW 20 is informed whether the IRD status is correct. The reporting of the IRD status to the SGW 20 can be performed by utilizing an User Datagram Protocol (UDP) from among the Internet protocol. Further, the informing of the IRD status to the SGW 20 is performed at intervals, for example, once every 10 seconds. When the processing of step 1514 is complete, the operation returns to step 1501 and the RGW 10 receives the next packet.

Next, an explanation of the SGW 20 is provided. A block diagram of the SGW 20 hardware is illustrated in FIG. 3. The SGW 20 is a computer system for router operation on the Internet network 40. As illustrated in FIG. 3, the SGW 20 includes a CPU 2001, a memory 2002, a disk controller 2003, a hard disk 2100, a console controller 2004, a console 2200, a network controller 2005 and a network controller 2006.

CPU 2001 controls the entire operation of the SGW 20. The memory 2002 stores the programs executable by the CPU 2001 and data. The disk controller 2003 controls the hard disk 2100. The hard disk (external memory) 2100 stores the programs executable by the CPU 2001 and data. The console controller 2004 controls the console 2200. The console 2200 performs input and output with the user. The network controller 2005 performs communication with the Internet network 40. The network controller 2006 communicates with the uplink station 21. The uplink station 21 converts the IP packet to the data format used by the communications satellite 30 and sends the result to the communications satellite 30.

The operation of the SGW 20 is explained below. The operation of the SGW 20 is carried out by CPU 2001 implementing a SGW program described in detail below. FIG. 6 is a drawing illustrating the data structure of the receiver station management table used in the SGW program processing.

As illustrated in FIG. 6, the receiver station management table 2700 includes an RGW address field 2701, a receiver station address range field 2702 and a receiver station status field 2703. The IP address for the RGW 10 installed in the satellite receiver station is stored in the RGW address field 2701. A proxy IP address range usable in that satellite receiver station is stored in the receiver station address range field 2702. The value for the IRD status transmitted from the RGW 10 is stored in the receiver station status field 2703.

Figure 7:
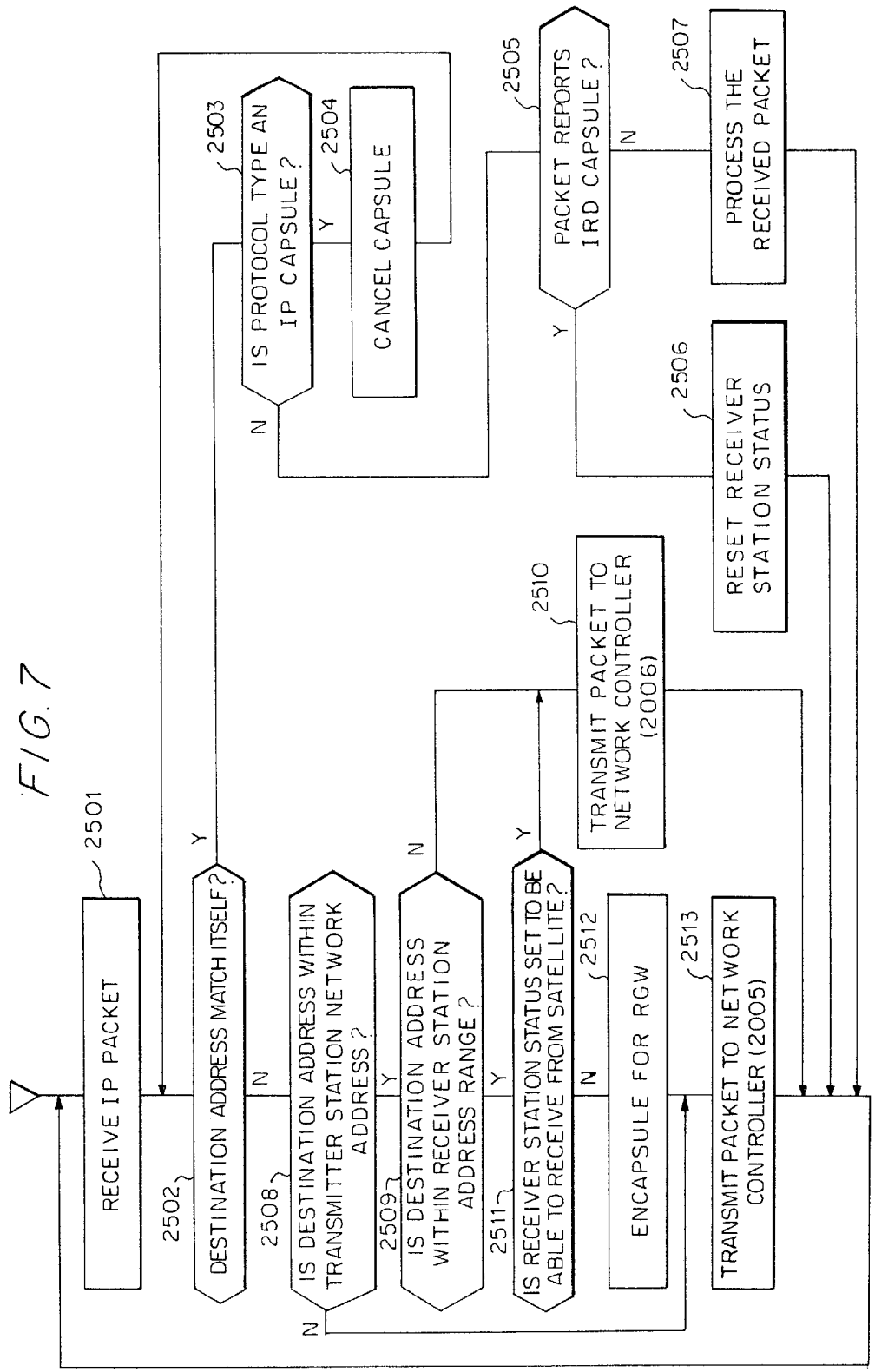
FIG. 7 is a flowchart of SGW program processing of an embodiment of the present invention.

FIG. 7 is a flowchart of the SGW processing program. The SGW processing (computer) program is executable by the CPU 2001 so as to perform the steps illustrated in FIG. 7. Each of the steps in FIG. 7 correspond to one or more instructions of the SGW processing program. The SGW processing program can, for example, be stored in memory 2002 or external memory 2100. The SGW processing program can also be provided to the SGW 20 for installation therein by a storage medium or network such as the Internet network. The storage medium could, for example, be a floppy disk, CD ROM, etc.

As illustrated in FIG. 7, when SGW 20 receives the IP packet from the network controller 2005 (step 2501) a check is made to determine whether the destination address matches the address of the SGW 20 (step 2502). If there is a match, a protocol type for that IP packet is checked to determine whether the IP packet is an encapsulated IP packet (step 2503).

If the check as per step 2503 indicates the IP packet is an encapsulated packet, then such signifies that the IP packet was received from the RGW 10 by way of the Internet network 40. The IP packet received corresponds to that illustrated in FIG. 8. Thereafter, the SGW 20 extracts the IP packet from the capsule (step 2504), then the operation returns to step 2502 and processing of the extracted IP packet is performed.

If the check as per step 2503 indicates the packet is not an encapsulated IP packet (step 2503), then operation proceeds to step 2505. Thus, the received IP packet is sent from the RGW 10 and a decision is made to determine whether the packet is a UDP packet reporting on the IRD status (step 2505).

If the packet is determined to be a UDP packet illustrating the IRD status as per step 2505, then the SGW 20 resets the status in the receiver station field 2703 of the receiver station management table 2700 in accordance with the IRD status reported by the applicable UDP packet (step 2506). If the packet is determined not to be a UDP packet as per step 2505, then operation proceeds to step 2507 and processing of the received IP packet is performed. In step 2507, just as with step 1505 in FIG. 5, various processings are performed in accordance with the Internet protocol. This portion of the processing is no different from the packet processing in a typical router so a detailed explanation is omitted here. After the processing of step 2506 or step 2507, the operation returns to step 2501 and the next IP packet is received. If the destination address does not match the address of the SGW 20 as per step 2502, then the SGW 20 determines whether the destination address is contained in the network address assigned to the satellite transmitter site (step 2508). When the destination address is not contained in the network address, the operation proceeds to step 2513. When the destination address is contained in the network address, the receiver station management table 2700 is referred to and a check is made to determine whether the destination address is contained in the receiver station address range field 2702 (step 2509).

If the destination address is not contained in the receiver station address range field 2702 as per step 2509, then the operation proceeds to step 2510. However, if the destination address is contained in the receiver station address range field 2702 as per step 2509, then this signifies the IP packet was received from the server 50 by way of the Internet network 40. The IP packet received corresponds to that illustrated in FIG. 9 or FIG. 10.).

When the destination address is contained in the receiver station address range field 2702, the SGW 20 checks the values of the receiver station status field 2703 of the applicable satellite receiver station to determine whether the satellite receiver station can receive from the satellite station (step 2511). If the receiver station can receive, is operating normally, the IP packet is transmitted to the network controller 2006 (step 2510) in order to transmit the IP packet in the flow illustrated in FIG. 9. Thus, the IP packet transmitted from the network controller 2006 is received at the uplink station 21 and transmitted to the communications satellite 30.

However, if the satellite receiver station cannot receive, not operating, then the SGW 20 requests the IP address of the RGW 10 from the values in the RGW address field 2701 of the receiver station management table 2700 in order to transmit the IP packet in the flow illustrated in FIG. 10. Accordingly, the IP packet is encapsulated in an IP packet having a destination address "RGW" and a source address "SGW" (step 2512). The encapsulated IP packet is transmitted to the network controller 2005 (step 2513). If the processing of step 2510 or of step 2513 is complete, then the operation returns to step 2501 and the next IP packet is received.

The asymmetrical routing is thus performed by the functioning of the RGW 10 and the SGW 20 as explained above. As explained above, asymmetrical routing can be achieved in the present embodiment using unidirectional paths in an unidirectional communications system (satellite communications system) without changing the preexisting routing protocol in network systems (Internet network 40) configured under the precondition of performing bidirectional packet communication using bidirectional paths.

In particular in this embodiment, unlike the previously described proxy server method, asymmetrical routing is performed based only on information in the network layer so that an application program utilizing a host protocol can be operated without having to make corrections in some manner. In other words, once the RGW 10 and the SGW 20 have been installed, the system can promptly respond even in the case of a newly standardized protocol.

Further, in the present embodiment, if communication utilizing the unidirectional path which is communication satellite 30 cannot be performed correctly, then communication is enabled by utilizing the bidirectional path which is the Internet network 40. Thus, even if a temporary problem occurs in the satellite data circuit, communication can continue without interruptions. Also, in the present embodiment, when performing address substitution with the RGW 10, the address pair for substitution is fixed. However, even if the address pair has been set, asymmetrical routing can be performed with no problem.

Still further in the present embodiment, after performing address substitution with RGW 10, the address substitution in a ratio of one to one between the address within the local network and the network address assigned to the satellite transmitter station site, asymmetrical routing can clearly be performed with no problem even if address substitution is performed in a ratio of N to 1.

If communication is not started from the PC 60 connected to the local network during address substitution when the address pair is actively set or address substitution is performed in a ratio of N to one, restrictions can prevent effective path control and this restriction is common to local nets installed with a firewall. However, the present embodiment is not subject to such characteristic restrictions. In the RGW 10 in such a case, if address substitution is not performed for a specific PC 60 address, the environment is the same as a typical Internet connection so that an externally accessed server can also be provided in the local network.

Yet further, the present embodiment is provided with one satellite transmitter station and one satellite receiver station. However, a plurality of either or both of the satellite transmitter station and satellite receiver station may be provided as needed. In the above described configuration of the present invention, an Internet communication system was capable of being configured by utilizing a unidirectional path including a satellite date communications path. The user achieved Internet access by utilizing the satellite data communications path.

Various applications are used on the Internet system with each application having special characteristics demanded by the Internet. In the case of file transfer, a high transmission speed is the most critical feature. However, in applications that perform interactive processing requiring only small quantities of data due to character space such as in Telnet, the transmission speed is not very critical and conversely, a user can make more satisfactory use of applications with a low transmission delay. Accordingly, utilization of communication paths having little delay even if low speed, is preferable in order to utilize a small data volume, interactive protocol.

An embodiment is hereafter described for changing the transmitter and receiver gateway paths according to the application being utilized. The structure of the system of this embodiment is identical to the structure illustrated in FIG. 1. The hardware structure of the RGW is identical to the structure illustrated in FIG. 2 and the hardware structure of the SGW is identical to the structure illustrated in FIG. 3. The SGW processing program is identical to the contents in FIG. 7.

Figure 11:
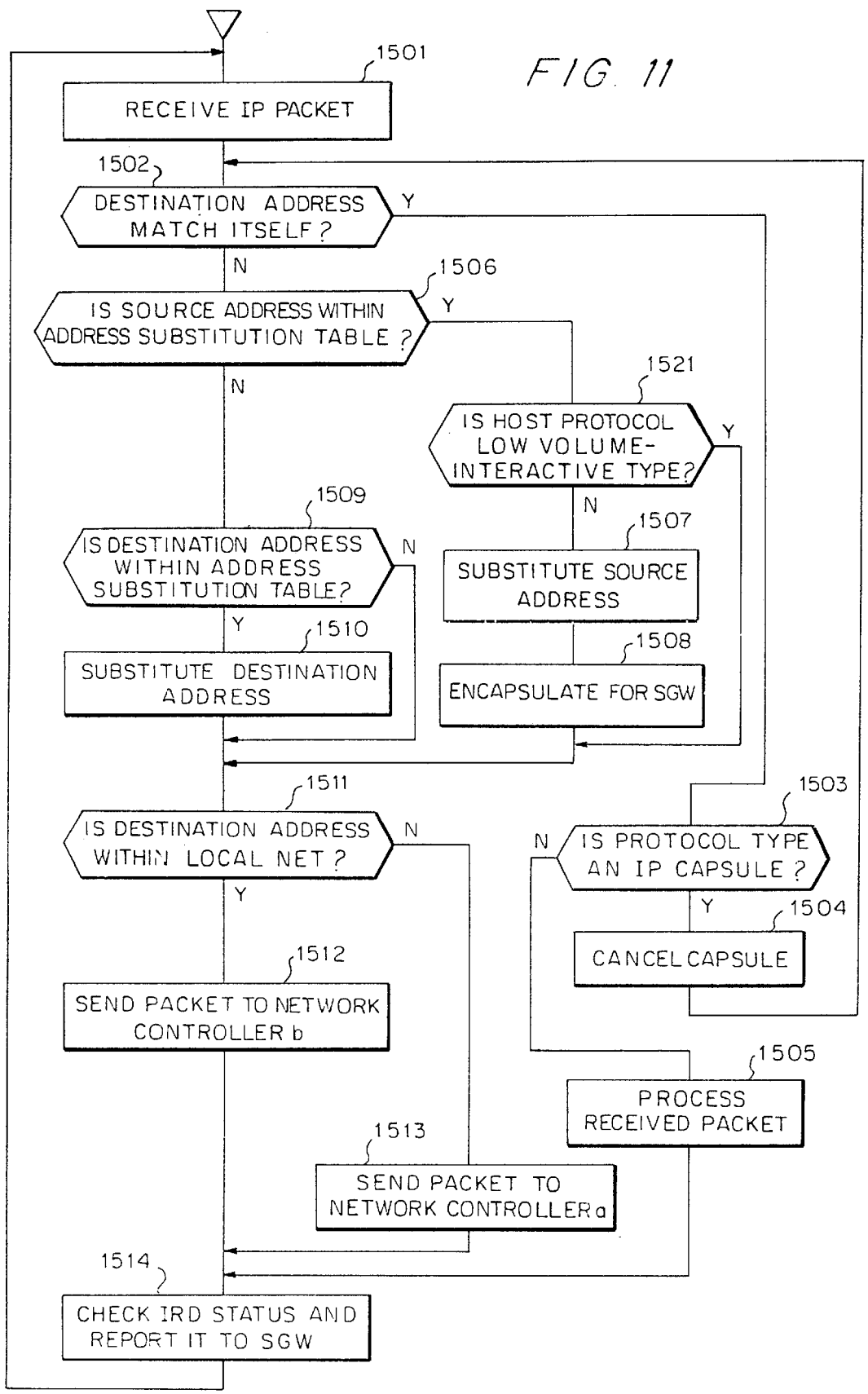
FIG. 11 is a flowchart of an RGW processing program of another embodiment of the present invention.

A flowchart of the RGW processing program listing the operations performed by the RGW of this embodiment is illustrated in FIG. 11. The RGW processing program is executed by the CPU 1001 so as to perform the steps illustrated in FIG. 11. Each of the steps illustrated in FIG. 11, correspond to one or more instructions of the RGW processing program. The RGW processing program can, for example, be stored in memory 1002 or external memory 1100. The RGW processing program can also be provided to the RGW 10 for installation therein by a storage medium or network such as the Internet network. The storage medium could, for example, be a floppy disk, CD ROM, etc. As illustrated in FIG. 11, aside from the fact that a step 1521 has been added between steps 1506 and 1507, this flowchart is identical to the flowchart illustrated in FIG. 5.

An identification is made as to whether the host protocol of the IP packet received in step 1521 described below, is an interactive protocol with a small data volume. If the IP packet is an interactive protocol, then the process flow proceeds to step 1511 and no substitution of the source address is performed. If the IP packet is not an interactive protocol, then the process proceeds in the usual flow to step 1507 and the source address is substituted. When no address substitution is performed the packet is sent to the server without going through the SGW and the reply from the server is conveyed to the RGW without taking the unidirectional path.

The identification of the host protocol is performed as follows. In a small data volume, interactive protocol the data quantity required by the protocol is relatively small. Since the user makes direct replies, the user is forced to await the arrival of the next response when the transmission delay is large. One example of a protocol giving the user a poor impression of a system and is extremely inconvenient to use is typified by the Telnet protocol. The IP packet contains information within the header indicating the type of host protocol. Widely used as host protocols for IP protocols are the highly reliable transport layer protocol know as TCP and the unreliable transport layer protocol known as UDP.

Figure 16:
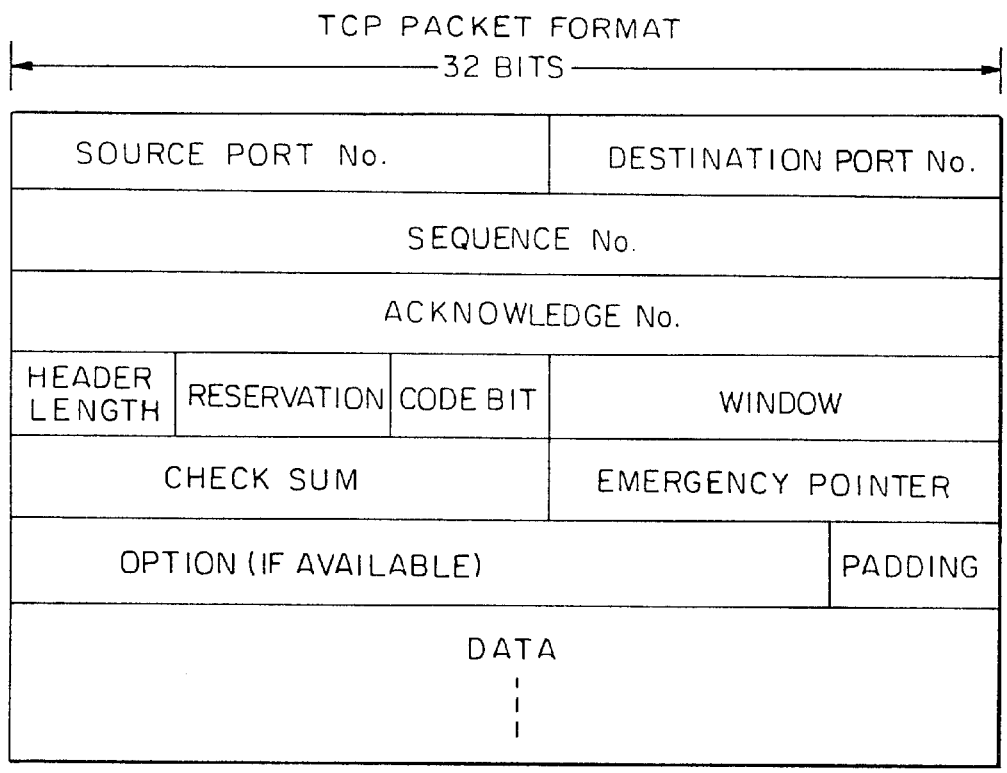
FIG. 16 is a drawing illustrating TCP packet format of another embodiment of the present invention.

As can be seen in FIG. 16, the TCP protocol has address information in the TCP header referred to as a source port number and an destination port number. The packet is utilized by way of these values to specify an application program. There is a system for specifying these port numbers. The numbers from 1 to 1023 for a previously known port referred to as a "well known port" are setup to utilize specially designated application protocols. The number 23 for instance is used for the Telnet protocol, the number 21 is used for the FTP protocol. Refer to the Internet document, RFC (Request for Comments) to obtain further details on assigning port numbers in this way for the Internet.

Accordingly, whether or not an IP packet is used as Telnet protocol can be determined if the host protocol type for the IP packet is TCP and if either the source port number or the destination port number within the TCP header is 23.

Figure 17:
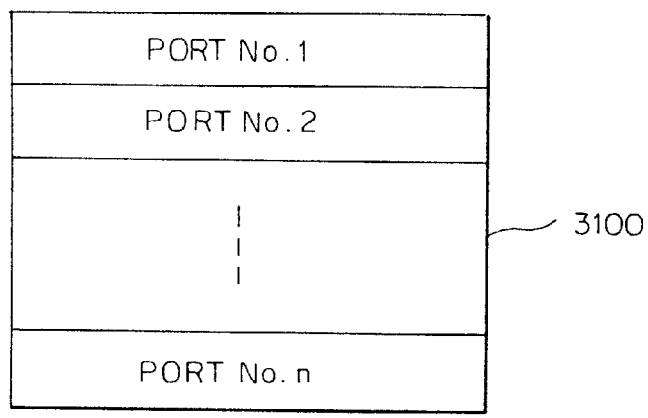
FIG. 17 is a port number registration table of another embodiment of the present invention.

As shown in FIG. 17, a port No. registration table 3100 is prepared for registering the port number for a small data volume, interactive protocol, such as Telnet. In step 1521 a determination (or identification) is made to determine whether either of the port numbers for the source port, number or the destination port number within the TCP header is a port number listed in the port No. registration table 3100. If so the upper protocol is identified (determined) as being interactive with low data volume.

In the configuration of this embodiment, networks with RGW, an SGW utilizing an Internet protocol are high speed.

However, in systems that perform asymmetrical routing on unidirectional paths with large-delays, a system can be achieved to regulate low data volume, namely interactive protocol packets in the RGW so as not to be routed through large delay unidirectional paths. Accordingly, high speed characteristics are maintained on a unidirectional path with non-interactive processing thereby avoiding the effects of large delays in unidirectional paths with interactive processing. Further, since the above host protocol identification processing is performed on the RGW, a comparison can be made by comparing end distributing the identification processing when making identification per the SGW on a system having a plurality of RGWs. This reduces the load required for processing to make the IP packet protocol identification.

Address substitution of the packet sent from PC 60 is not performed during the above mentioned low data volume, interactive protocol, so that the PC 60 must have a global IP address. Generally, a private IP address is widely used by the local networks of satellite receiver stations. However, the present invention cannot be utilized in such a case. Therefore, an embodiment of the present invention suitable for use when the PC 60 has a private IP address is described below.

Next an embodiment of the present invention for RGW operation is explained for switching the path according to the application characteristics on RGW when the local network of the satellite receiver station has a private IP address. The system layout for this embodiment is the same as illustrated in FIG. 1, and the RGW hardware structure is the same as illustrated in FIG. 2. Also, the SGW hardware structure is the same as illustrated in FIG., 3. The SGW processing program is the same that illustrated as in FIG. 7.

Figure 12:
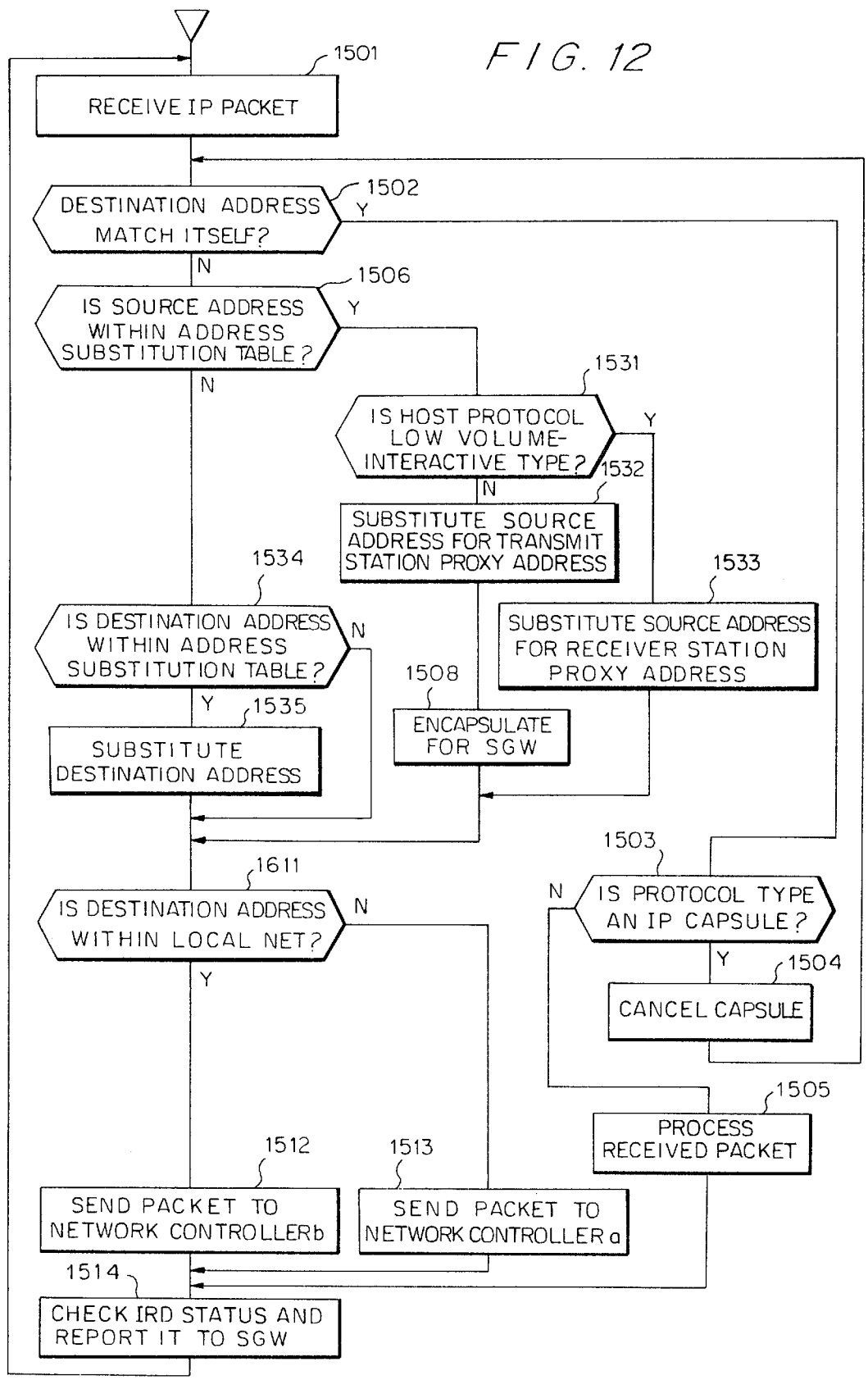
FIG. 12 is a flowchart of an RGW processing program of another embodiment of the present invention.

A flowchart for the RGW processing program listing tine, RGW operation in this embodiment is illustrated in the flowchart of FIG. 12. The RGW processing program is executable by the CPU 1001 so as to perform the steps illustrated in FIG. 12. Each of the steps illustrated in FIG. 12 corresponds to one or more instructions of the RGW computer program. The RGW processing program can, for example, be stored in memory 1002 or external memory 1100. The RGW program can also be provided to the RGW 10 for installation therein by a storage medium or network such as the Internet network. The storage medium could, for example, be a floppy disk, CD ROM, etc.

In the flowchart illustrated in FIG. 12, the process between step 1506 and step 1511 is different from the flowchart illustrated FIG. 5. However, the other portions of the processing illustrated in FIG. 12 are identical to the flowchart illustrated in FIG. 5.

FIG. 13 is a data structural chart for the address substitution table 3000 used for internal processing by the RGW processing program of the present embodiment. The address substitution table 3000 includes a source address field 1701, a transmitter station proxy address field 1702, and a receiver station proxy address field 1703. Aside from the addition of a receiver station proxy address field 1703, this address substitution table 3000 is identical to the address substitution table 1700 illustrated FIG. 4.

The IP addresses for the PC 60a and 60b and so on, within the local network are stored in the source address field 1701. The IP proxy address values approved for address substitution from the satellite transmitter station are stored in the transmitter station proxy address field 1702. The proxy IP address values for use in address substitution approved from the network associated with the satellite receiver station are stored in the receiver station proxy address field 1703. This proxy IP address must be a global IP address.

As illustrated in FIG. 12 when the source address in step 1506 does not match the source address field value, a check is made to determine whether the destination address matches either the transmitter proxy address field 1702 or the receiver station proxy address field 1703 (step 1534). If the destination address does match either of the fields 1702 1703, then the process proceeds to step 1535. The destination address is substituted into the value of the matching source address field and the operation then proceeds to step 1511.

When the source address in step 1506 matches the source address field value, a determination (identification) is made as to whether the host protocol of the packet is a low data volume, interactive protocol (step 1531). The processing for this step is identical to step 1521 in FIG. 11. If the result of step 1531 is a YES, then the process proceeds to step 1533. The source address is substituted into the value for the corresponding receiver station proxy address field 1703, and the process proceeds to step 1511.

If the result of the determination as per 1531 is NO, then the process proceeds to step 1532. The source address is substituted into the value for the transmitter station proxy address field 1702. The processing for this step is identical to step 1507 in FIG. 5. The packet is encapsulated for sending to the SGW (step 1508) step 1508 which is identical to that illustrated FIG. 5. Thereafter, process proceeds to step 1511.

When the packet in this embodiment transmitted from PC 60 is a packet with a low data volume, interactive protocol in the RGW 10 and the source address is not an address in the satellite station network, the packet is sent to the Internet network 40 for substitution with the address within the network belonging to the satellite receiver station. Therefore, the packet is exchanged by way of the server 50 without utilizing a unidirectional path and the SGW 20.

The present embodiment provides a system for performing asymmetrical routing using unidirectional paths with high speed but long delays utilizing RGW and SGW in networks for use with Internet protocol. The system operates such that when using a private IP address on a local network of a satellite transmitter station, low data volume, interactive protocol packets are controlled in the RGW so that long delay unidirectional paths are not used. However, the high speed characteristics of unidirectional paths are maintained with non-interactive processing to obtain a system which avoids the effects in interactive processing of long delay unidirectional paths. Further, the host protocol identification processing is performed on the RGW so that by comparing and distributing the identification processing when making identification per the SGW on a system having a plurality of RGWs, the required load for processing to make the IP packet protocol identification is therefore reduced.

An embodiment for performing changes in the path according to the protocol type with SGW and not RGW is explained below. The system layout for this embodiment is the same as in FIG. 1, and the RGW hardware structure is the same as in FIG. 2. The content of the RGW processing program is the same as in FIG. 5. Also, the SGW hardware structure is the same as in FIG. 3. However, the SGW processing program differs in one portion from that illustrated in FIG. 7.

Figure 14:
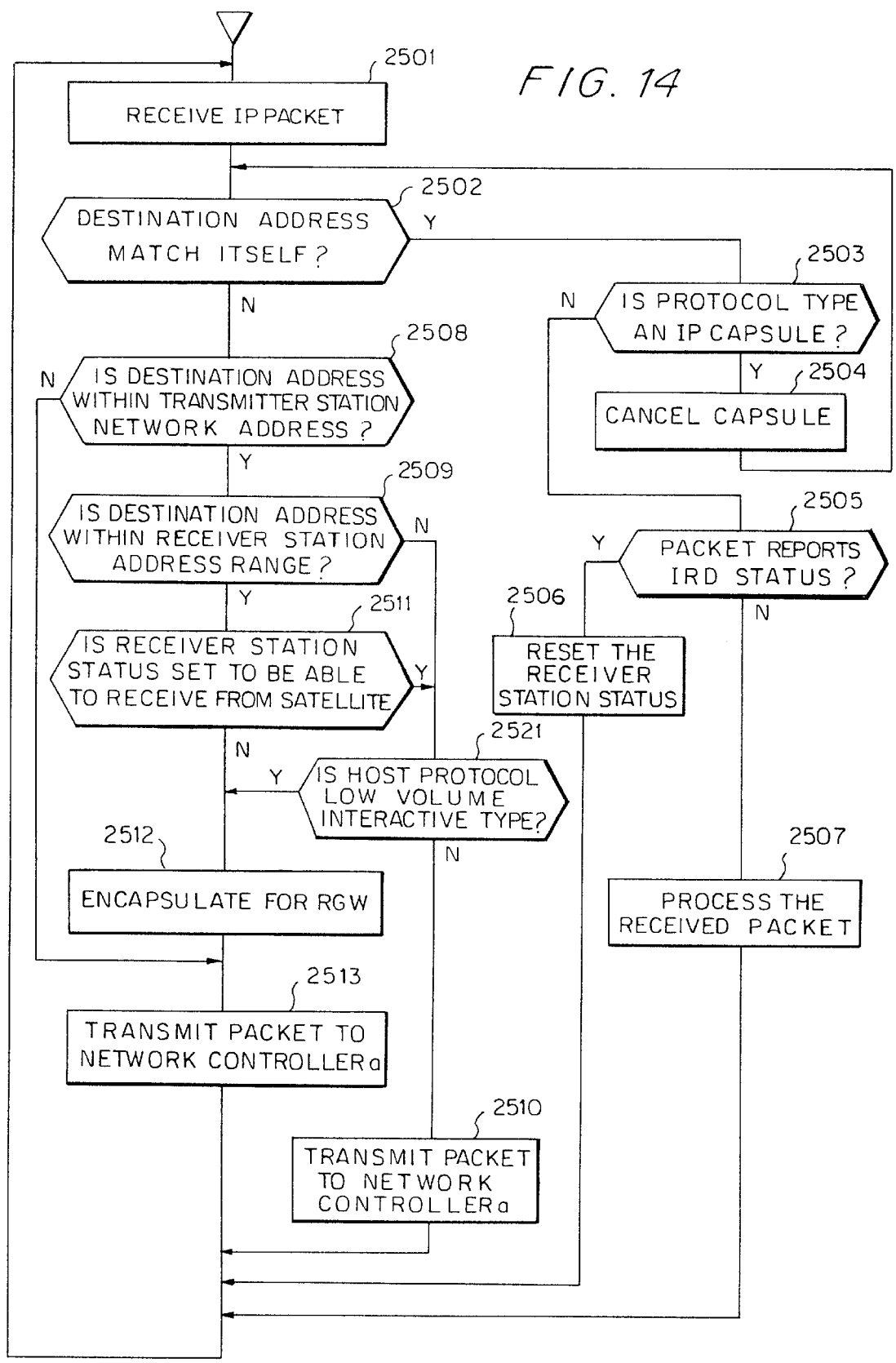
FIG. 14 is a flowchart of an SGW processing program of another embodiment of the present invention.

A flowchart for the SGW processing program listing the SGW operation in this embodiment is illustrated in the flowchart of FIG. 14. The SGW processing program is executable by the CPU 2001 so as to perform the steps illustrated in FIG. 5. Each of the steps illustrated in FIG. 14 corresponds to one or more instructions of the SGW processing (computer) program. The SGW processing program can, for example, be stored in memory 2002 or external memory 2100. The SGW processing program can also be provided to the SGW 20 for installation therein by a storage medium or network such as the Internet network. The storage medium could, for example, be a floppy disk, CD ROM, etc.

This flowchart differs from the flowchart in FIG. 7 in that a step 2521 has been added between steps 2509 and 2510. However, all other portions are identical to the flowchart of FIG. 7. As shown in FIG. 14, in the SGW processing program of the present embodiment, after determining in step 2509 that the destination address is within the receiver station address range, a determination (identification) is made in step 2521 as to whether the host protocol of said packet is a low data volume, interactive protocol. If YES, the process proceeds to step 2512 and the packet is encapsulated for sending to the RGW. If NO, the packet is transmitted unchanged on a unidirectional path (step 2510). The process for identifying the host protocol in step 2521 is the same as in step 1521 of FIG. 11.

When the SGW operates in this way, a low data volume, interactive protocol packet is encapsulated and sent bidirectionally between the SGW and the RGW without using a unidirectional path.

This embodiment provides a system for performing asymmetrical routing using unidirectional paths with high speed but long delays utilizing RGW and SGW in networks for use with Internet protocol. The system operates such that low data volume, interactive protocol packets, are controlled so as not to use long delay unidirectional paths in the SGW. However, the high speed characteristic of unidirectional paths is maintained with non-interactive processing to obtain a system which avoids the effects in interactive processing of long delay unidirectional path. Further, the identification process for the host protocol is performed on the SGW so that even when utilizing a private IP address in a local network of a satellite receiving station, there is no need to prepare an additional global IP address on the satellite station receive side.

Another embodiment of this invention for performing path changes according to the protocol type in the SGW is described below. The system structure of this embodiment is identical to that illustrated in FIG. 1. The hardware structure of the RGW is identical to that illustrated in FIG. 2. The RGW processing program are identical to that illustrated in FIG. 5. Also, the hardware structure of the SGW is identical to the structure illustrated in FIG. 3. However, SGW processing program differs in one portion from the flowchart illustrated in FIG. 7.

Figure 15:
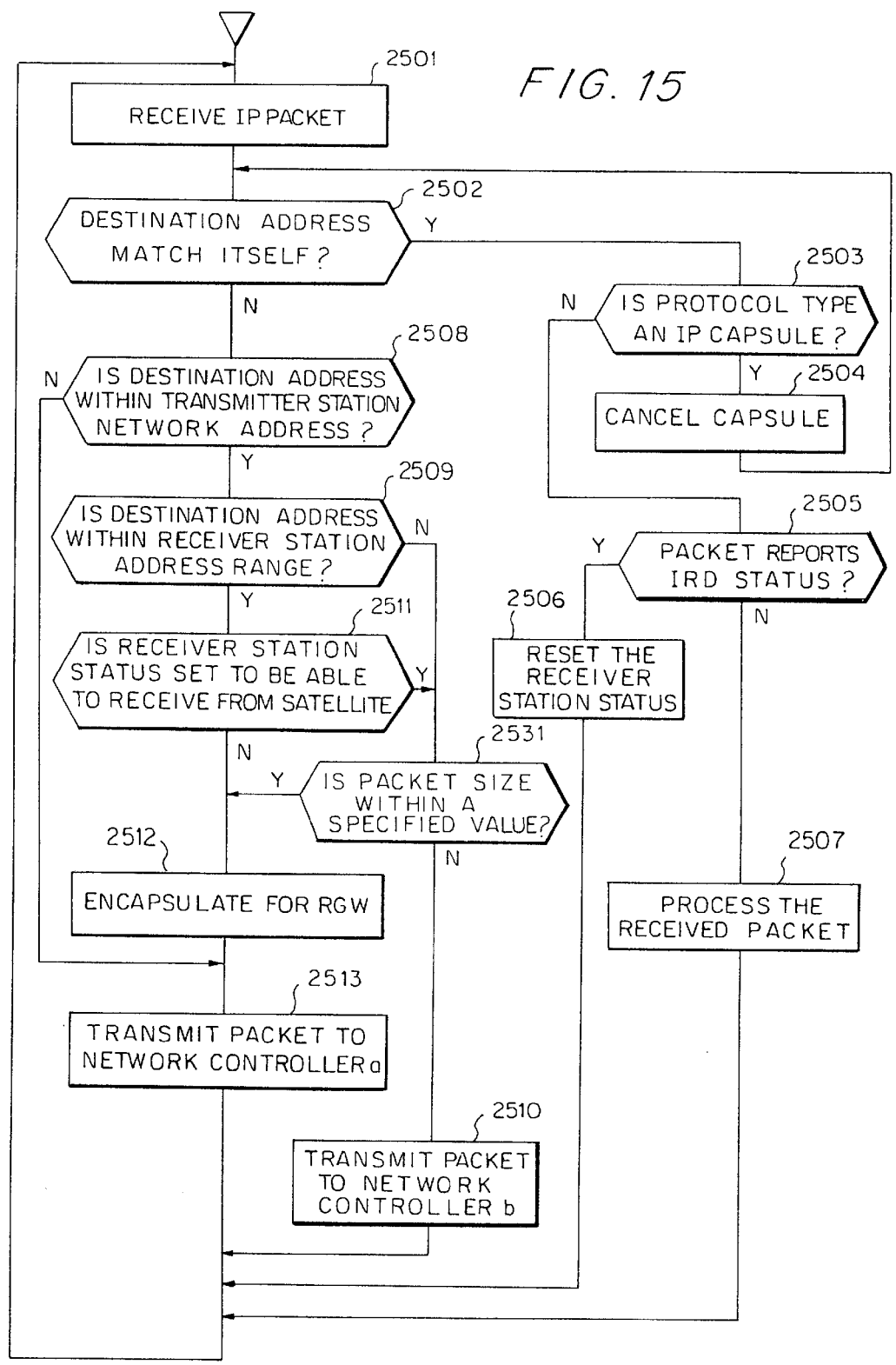
FIG. 15 is a flowchart of an SGW processing program of another embodiment of the present invention.

An SGW processing program flowchart listing the operation of the SGW of this embodiment is illustrated in FIG. 15. The SGW processing program is executable by the CPU 2001 so as to perform the steps illustrated in FIG. 15. Each of the steps illustrated in FIG. 15 corresponds to one or more instructions of the SGW processing program. The SGW processing program can, for example, be stored in memory 2002 or external memory 2100. The SGW processing program can also be provided to the SGW 20 for installation therein by a storage medium or network such as the Internet network. The storage medium could, for example, be a floppy disk, CD ROM, etc.

The flowchart in FIG. 15 differs from the flowchart illustrated in FIG. 7 in that a step 2531 has been added between step 2509 and step 2510. However, all other portions are identical to the flowchart of FIG. 7.

As shown in FIG. 15. after determining in step 2509 of the SGW processing program of this embodiment that the destination address is not within the range of the receiver station address, an identification is made in step 2531 to determine whether the packet size is within a specified value. If the result of step 2531 is a YES, then the process proceeds to step 2512 and the packet is encapsulated and sent to the RGW. However, if the result of step 2531 is NO, the process proceeds to step 2510 and the packet is sent unchanged on a unidirectional path.

When the SGW is operated in this way, packets within the specified size are encapsulated and transmitted along bidirectional paths between the SGW and the RGW without using unidirectional paths. This embodiment therefore determines whether or not the host protocol is a low data volume, interactive protocol packet by estimating the size of the packet and not by utilizing information in the header of the packet.

In low data volume, interactive applications, greater importance is attached to interactive characteristics, so that rather than large packets holding a certain amount of data, the transmission of small packets can often be observed. Therefore, for instance a small packet of 50 bytes or less is not used on paths with long delays, thereby effectively improving the response of low data volume, interactive applications.

Changing the paths taken by various packets provides that IP packets will not arrive in the same sequence as transmitted. However, problems are not likely to occur since the IP packet does not guarantee the arrival sequence of the original packet.

This embodiment provides a system for performing asymmetrical routing using unidirectional paths with high speed but long delays utilizing RGW and SGW in networks for use with an Internet protocol. The system operates such that packets whose size is within a specified value are controlled so as not to use long delay unidirectional paths in the SGW. However, the high speed characteristic of unidirectional paths is maintained with non-interactive processing to obtain a system which avoids the effects in interactive processing of long delay unidirectional paths. Further, the identification process of the host protocol is performed indirectly according to packet size and identification is not performed by a pre-established port number. Thus, there is no need to change the identification process even if a new low data volume, interactive protocol is developed.

As described above, the present invention is configured including a communication system using asymmetrical paths making use of high speed, large delay unidirectional paths without making changes to pre-existing network routing methods. Thus, the present invention by switching paths according to the type of host protocol maintains the high speed characteristic of unidirectional paths with non-interactive processing. Therefore, the system avoids the effects in interactive processing of long delay unidirectional paths.

The present invention as described above provides a communications system using asymmetrical paths. The present invention is capable of performing asymmetrical routing using unidirectional paths in order to perform unidirectional packet communication without making changes to already existing protocols in network systems. The present invention is configured under the precondition of performing bidirectional packet communication using bidirectional paths. In particular, the present invention unlike a conventional proxy server method, asymmetrical routing is performed based only on information in the network layer. Thus, no corrections have to be added to an application program running on a network system and permeable asymmetrical routing can be implemented in the application layer.

While the present invention has been described in detail and pictorially in the accompanying drawings, it is not limited to such details since many changes and modification recognizable to these of ordinary skill in the art having the benefit of the present invention may be made to the invention without departing from the spirit and scope of the invention, and all such modifications as would be obvious to one skilled in the art and/or which become possible as technology develops, are intended to be included within the scope of the following claims.

We claim:

1. A communication device connected to a network system configured to perform bidirectional packet communication utilizing a bidirectional path, and a local system separate from said network system, said communication device being installed at a receiver site of an unidirectional path to perform unidirectional packet communication utilizing said unidirectional path, said communication device comprising:

a first address substitution element which substitutes a source address of a packet transmitted from said local system with a preassigned address, hereinafter proxy address, in said network system corresponding to a transmitter site of said unidirectional path, and transmits the packet with the substitution to said network system; and a second address substitution element which substitutes a destination address of a packet sent from said unidirectional path with an address of said communication device connected to said local system when said destination address is said proxy address, and transmits the packet with the substitution to said local system.

2. A communication device connected to a network system configured to perform bidirectional packet communication utilizing a bidirectional path, said communication device being installed at a transmitter site of an unidirectional path to perform unidirectional packet communication utilizing said unidirectional path, said communication device comprising:

a routing element which transmits a packet on said unidirectional path when a destination address of a packet from said network system is a preassigned address, hereafter proxy address, in said network system corresponding to said transmitter site of said unidirectional path, and transmits said packet on said network system when said destination address of said packet is not said proxy address.

3. A communication system utilizing asymmetrical paths connected to a network system configured to perform bidirectional packet communication utilizing a bidirectional path, said communication system comprising:

a unidirectional path which performs unidirectional packet communication;

a communication device, hereafter transmitter gateway, connected to said network system, and installed at a transmitter site of said unidirectional path; and a communication device, hereafter receiver gateway, installed at a receiver site of said unidirectional path, and connected to said network system and a local system independent of said network system, wherein said receiver gateway comprises:
   a first address substitution element which substitutes a source address of a packet from said local system with a preassigned address, hereafter proxy address, in said network system corresponding to said transmitter site of said unidirectional path, and transmits the packet on which substitution was performed to said network system, and
   a second address substitution element which substitutes a destination address of a packet from said unidirectional path with an address of said communication device connected to said local system when said destination address is said proxy address, and transmits said packet on which substitution was performed to said local system; and
wherein said transmitter gateway comprises:
   a routing element which transmits a packet to said unidirectional path when a destination address of a packet transmitted from said network system is a proxy address, and transmits said packet on said network system when said destination address of said packet is not said proxy address.

4. A communication system according to claim 3, wherein said first address substitution element of said receiver gateway transmits said packet, on which substitution has been performed and which has been encapsulated, to said transmitter gateway by way of said network system, and
   wherein said routing element of said transmitter gateway performs routing of a packet after extraction of a packet from a capsule thereof, when said packet is an encapsulated packet transmitted from said network system.

5. A communication system according to claim 3, wherein said receiver gateway comprises:
   a communication element which detects whether communication is possible on said unidirectional path and informs said receiver gateway of a result of the detection by way of said network system,
   wherein said transmitter gateway comprises:
      a storage element which stores the result of the detection from said receiver gateway, and
      wherein said routing element of said transmitter gateway substitutes a destination address of a packet to be sent on said unidirectional path with said proxy address and transmits the packet on which substitution has been performed to said receiver gateway by way of said network system when communication has been detected as not being possible on said unidirectional path.

6. A communications system according to claim 4, wherein said receiver gateway comprises:
   a communication element which detects whether communication is possible on said unidirectional path and informs said receiver gateway of a result of the detection by way of said network system,
   wherein said transmitter gateway comprises:
      a storage element which stores the result of the detection from said receiver gateway, and
      wherein said routing element of said transmitter gateway substitutes a destination address of a packet to be sent on said unidirectional path with said proxy address and transmits the packet on which substitution has been performed to said receiver gateway by way of said network system when communication has been detected as not being possible on said unidirectional path.

7. A communication system according to claim 3, wherein said unidirectional path is provided by a satellite system.

8. A communication system utilizing asymmetrical paths connected to a network system which sends and receives packets between communication devices configured to perform routing so that assignment of packets is conducted between routers on bidirectional and unidirectional paths, said communication system comprising:
   a communication device, hereafter transmitter gateway, connected to said network system, and installed at a transmitter site of said unidirectional path; and
   a communication device, hereafter receiver gateway, installed at a receiver site of said unidirectional path, and connected to said network system and a local system independent of said network system,
   wherein said receiver gateway comprises:
      a first address substitution element which transmits a packet from said local system unchanged to said network system when protocol information included in a header of said packet satisfies a predetermined condition, substitutes a source address in said packet with a preassigned address, hereafter proxy address, in said network system corresponding to said transmitter site of said unidirectional path, and transmits said packet on which substitution was performed to said network system when said protocol information of said header in said packet does not satisfy the predetermined condition, and
      a second address substitution element which substitutes a transmitter station proxy address of a packet from said unidirectional path with an address of the communication device connected to said local system, and transmits said packet on which substitution was performed to said local system when a destination address of said packet is said transmitter station proxy address; and
   wherein said transmitter gateway comprises:
      a routing element which transmits a packet from said network system to said unidirectional path when a destination address of said packet is said transmitter station proxy address, and transmits said packet to said network system when said destination address of the packet is not said transmitter station proxy address.

9. A communication system according to claim 8, wherein said first address substitution element substitutes a source address of said packet from said local system with a preassigned address, hereafter receiver station proxy address, in said network system corresponding to said receiver site of said unidirectional path when said protocol information of the header of said packet satisfies a predetermined condition, and substitutes said source address with said transmitter station proxy address and transmits said packet which has undergone substitution to said network system when said protocol information of said header of said packet does not satisfy the predetermined condition;
   wherein said second address substitution element substitutes a transmitter station proxy address or a receiver station proxy address of a packet from said unidirectional path with an address of a communication device connected to said local system and transmits said packet on which substitution was performed to said local system when a destination address of said packet is said receiver station proxy address or said transmitter station proxy address; and
   wherein said routing element of said transmitter gateway transmits a packet to said unidirectional path when a destination address of said packet from said network system is said transmitter station proxy address, and transmits said packet to said network system when said destination address of the packet is not said transmitter station proxy address.

10. A communication system according to claim 8, wherein said first address substitution element substitutes a source address of a packet from said local system with a transmitter station proxy address, encapsulates the packet which underwent substitution, and transmits said encapsulated packet to said transmitter gateway by way of said network system;

wherein said second address substitution element substitutes said transmitter station proxy address with said address of said communication device connected to said local system, and transmits said packet which has undergone substitution onto said local system when said destination address of said packet transmitted from said unidirectional path is said transmitter station proxy address; and wherein said routing element performs routing of a capsule extracted from an encapsulated packet when said encapsulated packet was transmitted from said local system, encapsulates a packet from said network system, transmits said encapsulated packet to said receiver gateway by way of said network system when the destination address of the packet is said transmitter station proxy address and when protocol information included in a header of said packet satisfies a predetermined condition, transmits said encapsulated packet to said unidirectional path when said predetermined condition is not satisfied, transmits said encapsulated packet on said network system when said destination is not said proxy address and performs routing for a packet extracted from the capsule when the packet was encapsulated.

11. A communication system according to claim 8, wherein said first address substitution element substitutes a source address of a packet from said local system with a transmitter station proxy address, encapsulates said packet which underwent substitution and transmits said encapsulated packet to said transmitter gateway by way of said network system;

wherein said second address substitution element substitutes said transmitter station proxy address with an address of a communication device connected to said local system, and transmits a packet which has undergone substitution to said local system when a destination address of a packet from said unidirectional path is said transmitter station proxy address, wherein said routing element performs routing of a capsule extracted from an encapsulated packet when said encapsulated packet was transmitted from said local system, encapsulates a packet from said network system, transmits said encapsulated packet to said receiver gateway by way of said network system when a destination address of said encapsulated packet is said transmitter station proxy address, and a size of said encapsulated packet is below a specified value, sends said encapsulated packet to said unidirectional path when said encapsulated packet is above said specified value, sends said encapsulated packet to said network system when a destination address of said encapsulated packet is not said proxy address, and performs routing on said capsule extracted from said encapsulated packet when said packet had been encapsulated.

12. A communication system according to claim 8, wherein said unidirectional path is provided by a satellite system.

13. A method of performing communication in a network system and a local system separate from said network system utilizing bidirectional and unidirectional paths, said method comprising:

first substituting a source address of a packet transmitted from said local system with a preassigned address, hereinafter proxy address, in said network system corresponding to a transmitter site of said unidirectional paths, and transmitting the packet with the substitution to said network system, second substituting a destination address of a packet sent from said unidirectional path with an address of a communication device connected to said local system when said destination address is said proxy address, and transmitting the packet with the substitution to said local system.

14. A method of performing communication in a network system utilizing bidirectional and unidirectional paths, said method comprising:

routing by transmitting a packet on said unidirectional path when a destination address of a packet from said network system is a preassigned address, hereafter proxy address, in said network system corresponding to a transmitter site of said unidirectional path; and transmitting said packet on said network system when said destination address of said packet is not said proxy address.

15. A method of performing communication on a network system and a local system separate from said network system utilizing asymmetrical paths including a bidirectional path and a unidirectional path, said method comprising:

first conducting communication at a receiver gateway at a receiver site of said unidirectional path including:
    first substituting a source address of a packet from said local system with a preassigned address, hereafter proxy address, in said network system corresponding to a transmitter site of said unidirectional path, and transmitting the packet on which substitution was performed to said network system, and
    second substituting a destination address of a packet from said unidirectional path with an address of said communication device connected to said local system when said destination address is said proxy address, and transmitting said packet on which substitution was performed to said local system; and
second conducting communication at a transmitter gateway at a transmitter site of said unidirectional path including:
    routing by transmitting a packet to said unidirectional path when a destination address of a packet transmitted from said network system is a proxy address, and transmitting said packet on said network system when said destination address of said packet is not said proxy address.

16. A method according to claim 15, wherein said first substituting comprises:

transmitting said packet, on which substitution has been performed and which has been encapsulated, to said transmitter gateway by way of said network system, and wherein said routing comprises:

routing of a packet after extraction of a packet from a capsule thereof, when said packet is an encapsulated packet transmitted from said network system.

17. A method according to claim 15, wherein said first conducting communication comprises:

detecting whether communication is possible on said unidirectional path and indicating a result of the detection by way of said network system, wherein said second conducting communication comprises:
storing the result of the detection, and
said routing includes substituting a destination address of a packet to be sent on said unidirectional path with said proxy address, and transmitting the packet on which substitution has been performed by way of said network system when communication has been detected as not being possible on said unidirectional path.

18. A method according to claim 16, wherein said first conducting communication comprises:
detecting whether communication is possible on said unidirectional path and indicating a result of the detection by way of said network system,
wherein said second conducting communication comprises:
storing the result of the detection, and
said routing includes substituting a destination address of a packet to be sent on said unidirectional path with said proxy address, and transmitting the packet on which substitution has been performed by way of said network system when communication has been detected as not being possible on said unidirectional path.

19. A method according to claim 15, wherein said unidirectional path is provided by a satellite system.

20. A method of performing communication on a network system and a local system separate from said network system utilizing asymmetrical paths including a bidirectional path and a unidirectional path, said method comprising:
first conducting communication at a receiver gateway at a receiver site of said unidirectional path including:
first substituting by transmitting a packet from said local system unchanged to said network system when protocol information included in a header of said packet satisfies a predetermined condition, substituting a source address in said packet with a preassigned address, hereafter proxy address, in said network system corresponding to a transmitter site of said unidirectional path, and transmitting said packet on which substitution was performed to said network system when said protocol information of said header in said packet does not satisfy the predetermined condition, and
second substituting by substituting a transmitter station proxy address of a packet from said unidirectional path with an address of the communication device connected to said local system, and transmitting said packet on which substitution was performed to said local system when a destination address of said packet is said transmitter station proxy address; and
second conducting communication at a transmitter gateway at said transmitter site of said unidirectional path including:
routing by transmitting a packet from said network system to said unidirectional path when a destination address of said packet is said transmitter station proxy address, and transmitting said packet to said network system when said destination address of the packet is not said transmitter station proxy address.

21. A communication system according to claim 20, wherein said first substituting comprises:
substituting a source address of said packet from said local system with a preassigned address, hereafter receiver station proxy address, in said network system corresponding to said receiver site of said unidirectional path when said protocol information of the header of said packet satisfies a predetermined condition,
substituting said source address with said transmitter station proxy address, and
transmitting said packet which has undergone substitution to said network system when said protocol information of said header of said packet does not satisfy the predetermined condition;
wherein said second substituting comprises:
substituting a transmitter station proxy address or a receiver station proxy address of a packet from said unidirectional path with an address of a communication device connected to said local system, and
transmitting said packet on which substitution was performed to said local system when a destination address of said packet is said receiver station proxy address or said transmitter station proxy address; and
wherein said routing comprises:
transmitting a packet to said unidirectional path when a destination address of said packet from said network system is said transmitter station proxy address, and
transmitting said packet to said network system when said destination address of the packet is not said transmitter station proxy address.

22. A method according to claim 20, wherein said first address substituting comprises:
substituting a source address of a packet from said local system with a transmitter station proxy address, encapsulating the packet which underwent substitution, and
transmitting said encapsulated packet to said transmitter gateway by way of said network system;
wherein said second substituting comprises:
substituting said transmitter station proxy address with said address of said communication device connected to said local system, and
transmitting said packet which has undergone substitution onto said local system when said destination address of said packet transmitted from said unidirectional path is said transmitter station proxy address; and
wherein said routing comprises:
performing routing of a capsule extracted from an encapsulated packet when said encapsulated packet was transmitted from said local system,
encapsulating a packet from said network system, transmitting said encapsulated packet to said receiver gateway by way of said network system when the destination address of the packet is said transmitter station proxy address and when protocol information included in a header of said packet satisfies a predetermined condition, transmitting said encapsulated packet to said unidirectional path when said predetermined condition is not satisfied,
transmitting said encapsulated packet on said network system when said destination is not said proxy address, and
performing routing for a packet extracted from the capsule when the packet was encapsulated.

23. A method according to claim 20, wherein said first substituting comprises:

substituting a source address of a packet from said local system with a transmitter station proxy address, encapsulating said packet which underwent substitution, and transmitting said encapsulated packet to said transmitter gateway by way of said network system;

wherein said second substituting comprises:
  substituting said transmitter station proxy address with an address of a communication device connected to said local system, and
  transmitting a packet which has undergone substitution to said local system when a destination address of a packet from said unidirectional path is said transmitter station proxy address, and wherein said routing comprises:
  performing routing of a capsule extracted from an encapsulated packet when said encapsulated packet was transmitted from said local system,
  encapsulating a packet from said network system, transmitting said encapsulated packet to said receiver gateway by way of said network system when a destination address of said encapsulated packet is said transmitter station proxy address, and a size of said encapsulated packet is below a specified value,
  sending said encapsulated packet to said unidirectional path when said encapsulated packet is above said specified value, sends said encapsulated packet to said network system when a destination address of said encapsulated packet is not said proxy address, and
  performing routing on said capsule extracted from said encapsulated packet when said packet had been encapsulated.

24. A method according to claim 20, wherein said unidirectional path is provided by a satellite system.

25. A computer program stored on a storage medium for performing communication in a network system and a local system separate from said network system utilizing bidirectional and unidirectional paths, said computer program when executed causes processing apparatus to perform the steps of:
  first substituting a source address of a packet transmitted from said local system with a preassigned address, hereinafter proxy address, in said network system corresponding to a transmitter site of said unidirectional paths, and transmitting the packet with the substitution to said network system,
  second substituting a destination address of a packet sent from said unidirectional path with an address of a communication device connected to said local system when said destination address is said proxy address, and transmitting the packet with the substitution to said local system.

26. A computer program stored on a storage medium for performing communication in a network system utilizing bidirectional and unidirectional paths, said computer program when executed causes processing apparatus to perform the steps of:
  routing by transmitting a packet on said unidirectional path when a destination address of a packet from said network system is a preassigned address, hereafter proxy address, in said network system corresponding to a transmitter site of said unidirectional path; and transmitting said packet on said network system when said destination address of said packet is not said proxy address.

27. A computer program stored on a storage medium for performing communication on a network system and a local system separate from said network system utilizing asymmetrical paths including a bidirectional path and a unidirectional path, said computer program when executed causes processing apparatus to perform the steps of:
  first conducting communication at a receiver gateway at a receiver site of said unidirectional path including:
    first substituting a source address of a packet from said local system with a preassigned address, hereafter proxy address, in said network system corresponding to a transmitter site of said unidirectional path, and transmitting the packet on which substitution was performed to said network system, and
    second substituting a destination address of a packet from said unidirectional path with an address of said communication device connected to said local system when said destination address is said proxy address, and transmitting said packet on which substitution was performed to said local system; and
  second conducting communication at a transmitter gateway at a transmitter site of said unidirectional path including:
    routing by transmitting a packet to said unidirectional path when a destination address of a packet transmitted from said network system is a proxy address, and transmitting said packet on said network system when said destination address of said packet is not said proxy address.

28. A computer program according to claim 27, wherein said first substituting comprises:
  transmitting said packet, on which substitution has been performed and which has been encapsulated, to said transmitter gateway by way of said network system, and wherein said routing comprises:
  routing of a packet after extraction of a packet from a capsule thereof, when said packet is an encapsulated packet transmitted from said network system.

29. A computer program according to claim 27, wherein said first conducting communication comprises:
  detecting whether communication is possible on said unidirectional path and indicating a result of the detection by way of said network system,
  wherein said second conducting communication comprises:
    storing the result of the detection, and
    said routing includes substituting a destination address of a packet to be sent on said unidirectional path with said proxy address, and transmitting the packet on which substitution has been performed by way of said network system when communication has been detected as not being possible on said unidirectional path.

30. A computer program according to claim 28, wherein said first conducting communication comprises:
  detecting whether communication is possible on said unidirectional path and indicating a result of the detection by way of said network system,
  wherein said second conducting communication comprises:
    storing the result of the detection, and
    said routing includes substituting a destination address of a packet to be sent on said unidirectional path with said proxy address, and transmitting the packet on which substitution has been performed by way of said network system when communication has been detected as not being possible on said unidirectional path.

31. A computer program according to claim 27, wherein said unidirectional path is provided by a satellite system.

32. A computer program stored on a storage medium for performing communication on a network system and a local system separate from said network system utilizing asymmetrical paths including a bidirectional path and a unidirectional path, said computer program when executed causes processing apparatus to perform the steps of:

first conducting communication at a receiver gateway at a receiver site of said unidirectional path including:

first substituting by transmitting a packet from said local system unchanged to said network system when protocol information included in a header of said packet satisfies a predetermined condition, substituting a source address in said packet with a preassigned address, hereafter proxy address, in said network system corresponding to a transmitter site of said unidirectional path, and transmitting said packet on which substitution was performed to said network system when said protocol information of said header in said packet does not satisfy the predetermined condition, and second substituting by substituting a transmitter station proxy address of a packet from said unidirectional path with an address of the communication device connected to said local system, and transmitting said packet on which substitution was performed to said local system when a destination address of said packet is said transmitter station proxy address; and second conducting communication at a transmitter gateway at said transmitter site of said unidirectional path including:

routing by transmitting a packet from said network system to said unidirectional path when a destination address of said packet is said transmitter station proxy address, and transmitting said packet to said network system when said destination address of the packet is not said transmitter station proxy address.

33. A computer program according to claim 32, wherein said first substituting comprises:

substituting a source address of said packet from said local system with a preassigned address, hereafter receiver station proxy address, in said network system corresponding to said receiver site of said unidirectional path when said protocol information of the header of said packet satisfies a predetermined condition, substituting said source address with said transmitter station proxy address, and transmitting said packet which has undergone substitution to said network system when said protocol information of said header of said packet does not satisfy the predetermined condition;

wherein said second substituting comprises:

substituting a transmitter station proxy address or a receiver station proxy address of a packet from said unidirectional path with an address of a communication device connected to said local system, and transmitting said packet on which substitution was performed to said local system when a destination address of said packet is said receiver station proxy address or said transmitter station proxy address; and wherein said routing comprises:

transmitting a packet to said unidirectional path when a destination address of said packet from said network system is said transmitter station proxy address, and transmitting said packet to said network system when said destination address of the packet is not said transmitter station proxy address.

34. A computer program according to claim 32, wherein said first address substituting comprises:

substituting a source address of a packet from said local system with a transmitter station proxy address, encapsulating the packet which underwent substitution, and transmitting said encapsulated packet to said transmitter gateway by way of said network system;

wherein said second substituting comprises:

substituting said transmitter station proxy address with said address of said communication device connected to said local system, and transmitting said packet which has undergone substitution onto said local system when said destination address of said packet transmitted from said unidirectional path is said transmitter station proxy address; and wherein said routing comprises:

performing routing of a capsule extracted from an encapsulated packet when said encapsulated packet was transmitted from said local system, encapsulating a packet from said network system, transmitting said encapsulated packet to said receiver gateway by way of said network system when the destination address of the packet is said transmitter station proxy address and when protocol information included in a header of said packet satisfies a predetermined condition, transmitting said encapsulated packet to said unidirectional path when said predetermined condition is not satisfied, transmitting said encapsulated packet on said network system when said destination is not said proxy address, and performing routing for a packet extracted from the capsule when the packet was encapsulated.

35. A computer program according to claim 32, wherein said first substituting comprises:

substituting a source address of a packet from said local system with a transmitter station proxy address, encapsulating said packet which underwent substitution, and transmitting said encapsulated packet to said transmitter gateway by way of said network system;

wherein said second substituting comprises:

substituting said transmitter station proxy address with an address of a communication device connected to said local system, and transmitting a packet which has undergone substitution to said local system when a destination address of a packet from said unidirectional path is said transmitter station proxy address, and wherein said routing comprises:

performing routing of a capsule extracted from an encapsulated packet when said encapsulated packet was transmitted from said local system, encapsulating a packet from said network system, transmitting said encapsulated packet to said receiver gateway by way of said network system when a destination address of said encapsulated packet is said transmitter station proxy address, and a size of said encapsulated packet is below a specified value, sending said encapsulated packet to said unidirectional path when said encapsulated packet is above said specified value, sends said encapsulated packet to said network system when a destination address of said encapsulated packet is not said proxy address, and performing routing on said capsule extracted from said encapsulated packet when said packet had been encapsulated.

36. A computer program according to claim 32, wherein said unidirectional path is provided by a satellite system.

* * * * *